(12) United States Patent
Shen et al.

(10) Patent No.: US 11,897,973 B2
(45) Date of Patent: Feb. 13, 2024

(54) RESIN COMPOSITION AND ARTICLE MADE THEREFROM

(71) Applicant: Elite Electronic Material (KunShan) Co., Ltd., Kunshan (CN)

(72) Inventors: Chenyu Shen, Kunshan (CN); Rongtao Wang, Kunshan (CN); Xing He, Kunshan (CN); Penghui Fu, Kunshan (CN)

(73) Assignee: ELITE ELECTRONIC MATERIAL (KUNSHAN) CO., LTD., Kunshan (CN)

( * ) Notice: Subject to any disclaimer, the term of this patent is extended or adjusted under 35 U.S.C. 154(b) by 39 days.

(21) Appl. No.: 17/848,783

(22) Filed: Jun. 24, 2022

(65) Prior Publication Data

US 2023/0374173 A1    Nov. 23, 2023

(30) Foreign Application Priority Data

May 20, 2022   (CN) .......................... 202210553865.5

(51) Int. Cl.
| | | |
|---|---|---|
| *C08F 136/06* | (2006.01) | |
| *C08K 5/3432* | (2006.01) | |
| *C08K 5/3415* | (2006.01) | |
| *C08K 5/5399* | (2006.01) | |

(52) U.S. Cl.
CPC .......... *C08F 136/06* (2013.01); *C08K 5/3415* (2013.01); *C08K 5/3432* (2013.01); *C08K 5/5399* (2013.01)

(58) Field of Classification Search
CPC ....... C08K 5/3477; C08K 5/5399; C08L 7/00; C08L 9/00; C08L 23/00; C08L 23/16; C08L 71/12
See application file for complete search history.

(56) References Cited

U.S. PATENT DOCUMENTS

| | | | | |
|---|---|---|---|---|
| 2014/0150963 A1* | 6/2014 | He | ....................... | C08K 5/5399 523/435 |
| 2016/0145370 A1* | 5/2016 | Kitai | ........................ | C08J 5/244 428/196 |
| 2016/0280907 A1* | 9/2016 | Zhang | ................... | C09D 163/00 |
| 2017/0158854 A1* | 6/2017 | Ueno | ....................... | B32B 27/06 |
| 2020/0087432 A1* | 3/2020 | Zhang | ........................ | C08K 5/13 |
| 2021/0189120 A1* | 6/2021 | Zhang | ....................... | C08J 5/246 |

\* cited by examiner

*Primary Examiner* — Robert C Boyle
(74) *Attorney, Agent, or Firm* — Muncy, Geissler, Olds & Lowe, P.C.

(57) ABSTRACT

A resin composition includes the following components or a prepolymer thereof: (A) 100 parts by weight of a polyolefin; and (B) 10 parts by weight to 50 parts by weight of a compound of Formula (1) having a pH value of 10 or less. In Formula (1), n is an integer of 3 to 6, each Y and Z are independently selected from o-vinylphenoxy group and phenoxy group, and each Y and Z are not phenoxy group at the same time. The prepolymer is prepared by subjecting a mixture to a prepolymerization reaction, and the mixture at least comprises the component (A) and the component (B). An article is made from the resin composition. The article includes a prepreg, a resin film, a laminate or a printed circuit board and achieves improvements in one or more properties including resin filling uniformity, dissipation factor variation rate under heat, glass transition temperature, Z-axis ratio of thermal expansion, peeling strength and thermal resistance after moisture absorption.

Formula (1)

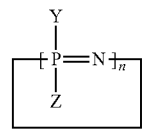

14 Claims, 1 Drawing Sheet

RESIN COMPOSITION AND ARTICLE MADE THEREFROM

CROSS-REFERENCE TO RELATED APPLICATION

This application claims the priority benefits of China Patent Application No. 202210553865.5, filed on May 20, 2022. The entirety the above-mentioned patent application is hereby incorporated by reference herein and made a part of this specification.

BACKGROUND

1. Field of the Disclosure

The present disclosure mainly relates to a resin composition and an article made therefrom, more particularly to a resin composition useful for preparing a prepreg, a resin film, a laminate or a printed circuit board.

2. Description of Related Art

With the rapid advancement of mobile communication technology, resin materials suitable for data transmission at high frequency and high speed have become the mainstream of laminate development, which requires low dissipation factor of laminate materials even at high temperature variation, so as to make laminates operable normally in a high temperature environment. Therefore, there is a need for developing materials suitable for a high performance laminate.

SUMMARY

To overcome the problems of prior arts, particularly one or more above-mentioned property demands facing conventional resin materials, it is a primary object of the present disclosure to provide a resin composition so as to achieve one or more desirable properties including high resin filling uniformity, low dissipation factor variation rate under heat, high glass transition temperature, low Z-axis ratio of thermal expansion, high peeling strength and high thermal resistance after moisture absorption.

To achieve the above-mentioned objects, the present disclosure provides a resin composition, comprising the following components or a prepolymer thereof:
(A) 100 parts by weight of a polyolefin; and
(B) 10 parts by weight to 50 parts by weight of a compound of Formula (1) having a pH value of 10 or less;

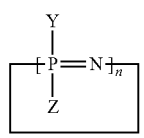

Formula (1)

in Formula (1), n is an integer of 3 to 6, each Y and Z are independently selected from o-vinylphenoxy group and phenoxy group, and each Y and Z are not phenoxy group at the same time;
wherein the prepolymer is prepared by subjecting a mixture to a prepolymerization reaction, and the mixture at least comprises the component (A) and the component (B).

For example, in one embodiment, the compound of Formula (1) has a pH value of 5 to 10.

For example, in one embodiment, the polyolefin comprises polybutadiene, polyisoprene, styrene-butadiene copolymer, styrene-isoprene copolymer, styrene-butadiene-divinylbenzene terpolymer, styrene-butadiene-maleic anhydride terpolymer, vinyl-polybutadiene-urethane oligomer, maleic anhydride-butadiene copolymer, polymethylstyrene, hydrogenated polybutadiene, hydrogenated styrene-butadiene-divinylbenzene terpolymer, hydrogenated styrene-butadiene-maleic anhydride terpolymer, hydrogenated styrene-butadiene copolymer, hydrogenated styrene-isoprene copolymer or a combination thereof.

For example, in one embodiment, the resin composition further comprises 0.001 part by weight to 0.5 part by weight of a compound of Formula (2), a compound of Formula (3), a compound of Formula (4) or a combination thereof:

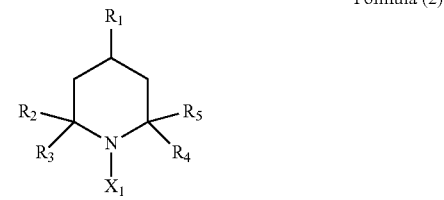

Formula (2)

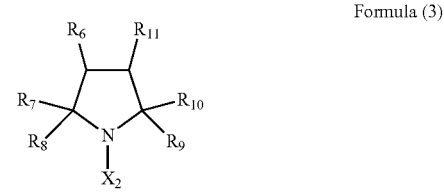

Formula (3)

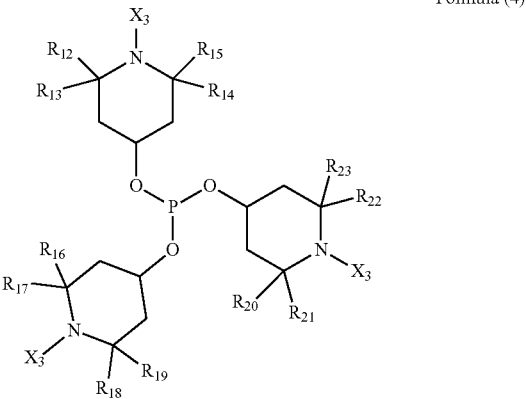

Formula (4)

wherein $X_1$ is an oxygen radical or a hydroxyl group; $R_2$ to $R_5$ are independently a hydrogen atom or a C1-C5 alkyl group, and $R_2$ to $R_5$ are not a hydrogen atom at the same time; and $R_1$ is a hydrogen atom, a C1-C5 alkyl group, an amino group, a hydroxyl group, a carbonyl group or a carboxyl group;

wherein $X_2$ is an oxygen radical or a hydroxyl group; $R_7$ to $R_{10}$ are independently a hydrogen atom or a C1-C5 alkyl group, and $R_7$ to $R_{10}$ are not a hydrogen atom at the same time; and $R_6$ and $R_{11}$ are independently a hydrogen atom, a C1-C5 alkyl group, an amino group, a hydroxyl group, a carbonyl group or a carboxyl group, or $R_6$ and $R_{11}$ together define a benzene ring structure;

wherein $X_3$ each independently is an oxygen radical or a hydroxyl group; and $R_{12}$ to $R_{23}$ are independently a hydrogen atom or a C1-C5 alkyl group, and $R_{12}$ to $R_{23}$ are not a hydrogen atom at the same time.

For example, in one embodiment, the compound of Formula (2) comprises a compound of any one of Formula (5) to Formula (9) or a combination thereof:

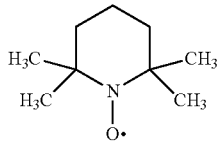
Formula (5)

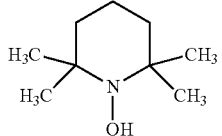
Formula (6)

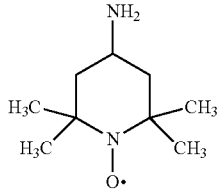
Formula (7)

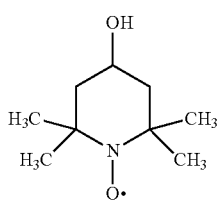
Formula (8)

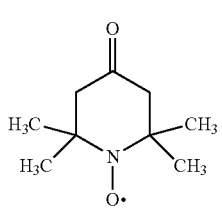
Formula (9)

For example, in one embodiment, the compound of Formula (3) comprises a compound of any one of Formula (10) to Formula (13) or a combination thereof:

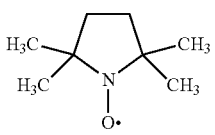
Formula (10)

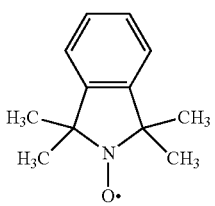
Formula (11)

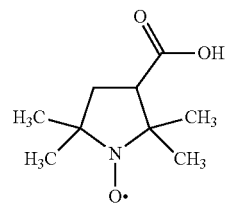
Formula (12)

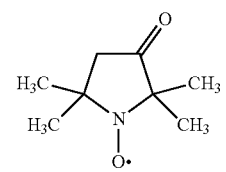
Formula (13)

For example, in one embodiment, the compound of Formula (4) comprises a compound of any one of Formula (14) to Formula (15) or a combination thereof:

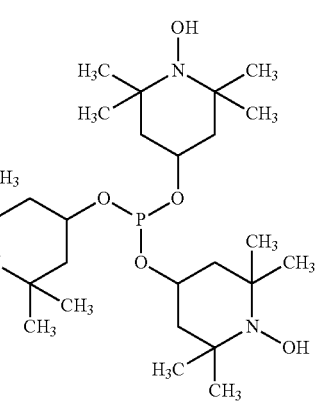
Formula (14)

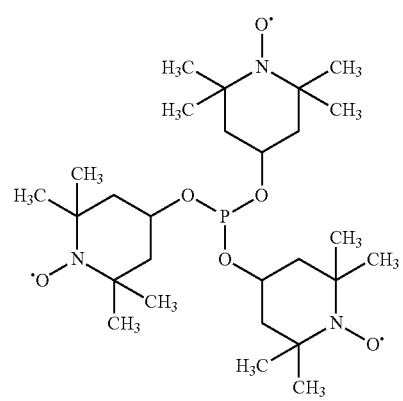
Formula (15)

For example, in one embodiment, the prepolymer is prepared by subjecting the component (A) and the component (B) to a prepolymerization reaction having a conversion rate of between 10% and 99%.

For example, in one embodiment, the resin composition further comprises an unsaturated C=C double bond-containing polyphenylene ether resin.

For example, in one embodiment, the resin composition further comprises 1,2-bis(vinylphenyl)ethane, bis(vinylbenzyl)ether, divinylbenzene, divinylnaphthalene, divinylbiphenyl, t-butyl styrene, triallyl isocyanurate, triallyl cyanurate, 1,2,4-trivinyl cyclohexane, diallyl bisphenol A, styrene, butadiene, decadiene, octadiene, vinylcarbazole, acrylate or a combination thereof.

For example, in one embodiment, the resin composition further comprises a benzoxazine resin, an epoxy resin, a polyester resin, a phenolic resin, an amine curing agent, a polyamide, a polyimide, a styrene maleic anhydride, a maleimide resin, a cyanate ester, a maleimide triazine resin or a combination thereof.

For example, in one embodiment, the resin composition further comprises flame retardant, curing accelerator, inorganic filler, surface treating agent, coloring agent, solvent, toughening agent or a combination thereof.

In another aspect, the present disclosure provides an article made from the resin composition described above, which comprises a prepreg, a resin film, a laminate or a printed circuit board.

For example, in one embodiment, articles made from the resin composition disclosed herein have one, more or all of the following properties:
- absence of patterns on the copper-free surface of the inner layer wiring laminate without surface copper;
- a dissipation factor variation rate under heat of less than or equal to 30% calculated according to a dissipation factor as measured by reference to JIS C2565 at 10 GHz after being subject to standing still at 188° C. for 48 hours;
- a glass transition temperature as measured by reference to IPC-TM-650 2.4.24.4 of greater than or equal to 225° C.;
- a Z-axis ratio of thermal expansion as measured by reference to IPC-TM-650 2.4.24.5 of less than or equal to 1.52%;
- a peeling strength as measured by reference to IPC-TM-650 2.4.8 of greater than or equal to 3.3 lb/in; and
- no delamination occurs after subjecting the article to a thermal resistance after moisture absorption test by reference to IPC-TM-650 2.6.16.1 and IPC-TM-650 2.4.23.

DESCRIPTION OF THE EMBODIMENTS

Figure 1:
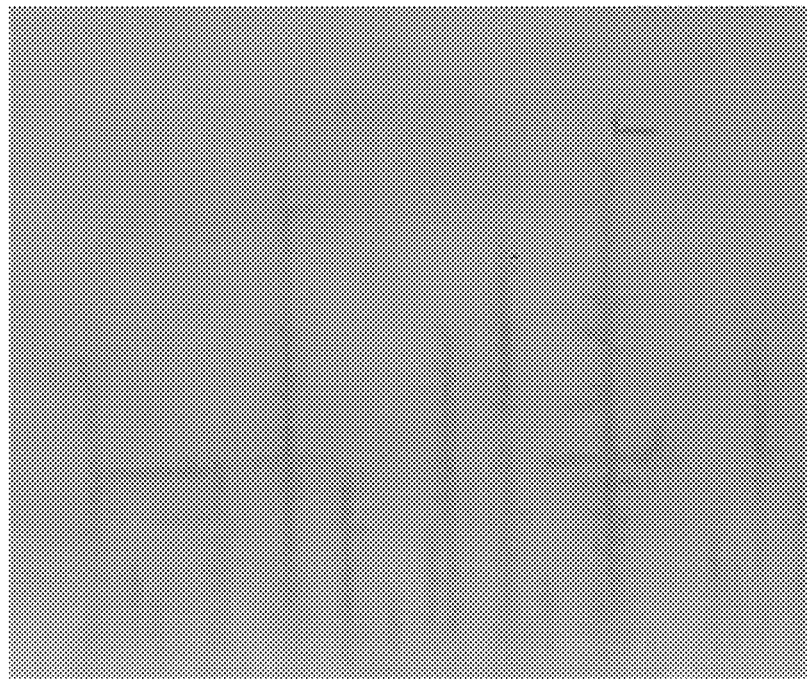
FIG. 1 shows the patterns of a laminate.

To enable those skilled in the art to further appreciate the features and effects of the present disclosure, words and terms contained in the specification and appended claims are described and defined. Unless otherwise defined, all technical and scientific terms used herein have the same meaning as commonly understood by those of ordinary skill in the art to which this disclosure pertains. In the case of conflict, the present document and definitions contained herein will control.

While some theories or mechanisms may be proposed herein, the present disclosure is not bound by any theories or mechanisms described regardless of whether they are right or wrong, as long as the embodiments can be implemented according to the present disclosure.

As used herein, "a," "an" or any similar expression is employed to describe components and features of the present disclosure. This is done merely for convenience and to give a general sense of the scope of the present disclosure. Accordingly, this description should be read to include one or at least one and the singular also includes the plural unless it is obvious to mean otherwise.

As used herein, "or a combination thereof" means "or any combination thereof", and "any" means "any one", vice versa.

As used herein, the term "encompasses," "encompassing," "comprises," "comprising," "includes," "including," "has," "having" or any other variant thereof is construed as an open-ended transitional phrase intended to cover a non-exclusive inclusion. For example, a composition or manufacture that comprises a list of elements is not necessarily limited to only those elements but may include other elements not expressly listed or inherent to such composition or manufacture. Further, unless expressly stated to the contrary, the term "or" refers to an inclusive or and not to an exclusive or. For example, a condition "A or B" is satisfied by any one of the following: A is true (or present) and B is false (or not present), A is false (or not present) and B is true (or present), and both A and B are true (or present). In addition, whenever open-ended transitional phrases are used, such as "encompasses," "encompassing," "comprises," "comprising," "includes," "including," "has," "having" or any other variant thereof, it is understood that close-ended transitional phrases such as "consisting of," "composed by" and "remainder being" and partially open-ended transitional phrases such as "consisting essentially of," "primarily consisting of," "mainly consisting of," "primarily containing," "composed essentially of," "essentially having," etc. are also disclosed and included.

In this disclosure, features and conditions such as values, numbers, contents, amounts or concentrations are presented as a numerical range or a percentage range merely for convenience and brevity. Therefore, a numerical range or a percentage range should be interpreted as encompassing and specifically disclosing all possible subranges and individual numerals or values therein, including integers and fractions, particularly all integers therein. For example, a range of "1.0 to 8.0" or "between 1.0 and 8.0" should be understood as explicitly disclosing all subranges such as 1.0 to 8.0, 1.0 to 7.0, 2.0 to 8.0, 2.0 to 6.0, 3.0 to 6.0, 4.0 to 8.0, 3.0 to 8.0 and so on and encompassing the endpoint values, particularly subranges defined by integers, as well as disclosing all individual values in the range such as 1.0, 2.0, 3.0, 4.0, 5.0, 6.0, 7.0 and 8.0. Unless otherwise defined, the aforesaid interpretation rule should be applied throughout the present disclosure regardless of broadness of the scope.

Whenever amount, concentration or other numeral or parameter is expressed as a range, a preferred range or a series of upper and lower limits, it is understood that all ranges defined by any pair of the upper limit or preferred value and the lower limit or preferred value are specifically disclosed, regardless whether these ranges are explicitly described or not. In addition, unless otherwise defined, whenever a range is mentioned, the range should be interpreted as inclusive of the endpoints and every integers and fractions in the range.

Given the intended purposes and advantages of this disclosure are achieved, numerals or figures have the precision of their significant digits. For example, 40.0 should be understood as covering a range of 39.50 to 40.49.

As used herein, a Markush group or a list of items is used to describe examples or embodiments of the present disclosure. A skilled artisan will appreciate that all subgroups of members or items and individual members or items of the Markush group or list can also be used to describe the present disclosure. For example, when X is described as being "selected from a group consisting of X1, X2 and X3,"

it is intended to disclose the situations of X is X1 and X is X1 and/or X2 and/or X3. In addition, when a Markush group or a list of items is used to describe examples or embodiments of the present disclosure, a skilled artisan will understand that any subgroup or any combination of the members or items in the Markush group or list may also be used to describe the present disclosure. Therefore, for example, when X is described as being "selected from a group consisting of X1, X2 and X3" and Y is described as being "selected from a group consisting of Y1, Y2 and Y3," the disclosure includes any combination of X is X1 and/or X2 and/or X3 and Y is Y1 and/or Y2 and/or Y3.

Unless otherwise specified, according to the present disclosure, a compound refers to a chemical substance formed by two or more elements bonded with chemical bonds and may comprise a small molecule compound and a polymer compound, but not limited thereto. Any compound disclosed herein is interpreted to not only include a single chemical substance but also include a class of chemical substances having the same kind of components or having the same property.

Unless otherwise specified, according to the present disclosure, a polymer refers to the product formed by monomer(s) via polymerization and usually comprises multiple aggregates of polymers respectively formed by multiple repeated simple structure units by covalent bonds; the monomer refers to the compound forming the polymer. A polymer may comprise a homopolymer, a copolymer, a prepolymer, etc., but not limited thereto. A homopolymer refers to the polymer formed by the polymerization of one monomer. Copolymers comprise: random copolymers, such as a structure of -AABABBBAAABBA-; alternating copolymers, such as a structure of -ABABABAB-; graft copolymers, such as a structure of -AA(A-BBBB)AA(A-BBBB)AAA-; and block copolymers, such as a structure of -AAAAA-BBBBBB-AAAAA-. For example, a styrene-butadiene copolymer disclosed herein is interpreted as comprising a styrene-butadiene random copolymer, a styrene-butadiene alternating copolymer, a styrene-butadiene graft copolymer, a styrene-butadiene block copolymer or a combination thereof. A prepolymer refers to a polymer having a lower molecular weight between the molecular weight of monomer and the molecular weight of final polymer, and a prepolymer contains a reactive functional group capable of participating further polymerization to obtain the final polymer product which has been fully crosslinked or cured. The term "polymer" includes but is not limited to an oligomer. An oligomer refers to a polymer with 2-20, typically 2-5, repeating units.

To those of ordinary skill in the art to which this disclosure pertains, a resin composition containing an additive and three compounds (e.g., A, B and C), a total of four components, is different form a resin composition containing the additive and a prepolymer formed by the three compounds (e.g., A, B and C), a total of two components, as they are completely different from each other in the aspects of preparation method, physical or chemical properties of the resin composition and properties of an article or product made therefrom. For example, the former involves mixing A, B, C and the additive to form the resin composition; in contrast, the latter involves first subjecting a mixture comprising A, B and C to a prepolymerization reaction at proper conditions to form a prepolymer and then mixing the prepolymer with the additive to form the resin composition. For example, to those of ordinary skill in the art to which this disclosure pertains, the two resin compositions have completely different compositions; in addition, because the prepolymer formed by A, B and C functions completely different from A, B and C individually or collectively in the resin composition, the two resin compositions should be construed as completely different chemical substances and have completely different chemical statuses. For example, to those of ordinary skill in the art to which this disclosure pertains, because the two resin compositions are completely different chemical substances, articles made therefrom will not have the same properties. For example, to a resin composition containing a crosslinking agent and a prepolymer formed by A, B and C, since A, B and C have been partially reacted or converted during the prepolymerization reaction to form the prepolymer, during the process of heating to semi-cure the resin composition at a high temperature condition, a partial crosslinking reaction occurs between the prepolymer and the crosslinking agent but not between A, B and C individually and the crosslinking agent. As such, articles made from the two resin compositions will be completely different and have completely different properties.

Unless otherwise specified, according to the present disclosure, when the term acrylate compound is expressed as (meth)acrylate, it is intended to comprise both situations of containing and not containing a methyl group; for example, cyclohexane dimethanol di(meth)acrylate is construed as including cyclohexane dimethanol diacrylate, cyclohexane dimethanol dimethacrylate or both.

Unless otherwise specified, an alkyl group described herein is construed to encompass various isomers thereof. For example, a propyl group is construed to encompass n-propyl and i-propyl.

Unless otherwise specified, the term "resin" of the present disclosure is a widely used common name of a synthetic polymer and is construed as comprising monomer and its combination, polymer and its combination or a combination of monomer and its polymer, but not limited thereto.

For example, the term "unsaturated C=C double bond-containing" is construed to encompass, but not limited to, the following functional group:

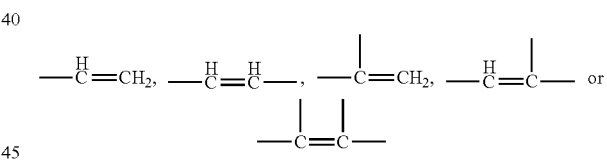

According to the present disclosure, examples of the unsaturated C=C double bond preferably include but not limited to a vinyl group, a vinylene group, an allyl group, a (meth)acryloyl group or a combination thereof.

Unless otherwise specified, according to the present disclosure, a modification comprises a product derived from a resin with its reactive functional group modified, a product derived from a prepolymerization reaction of a resin and other resins, a product derived from a crosslinking reaction of a resin and other resins, a product derived from copolymerizing a resin and other resins, etc.

The unsaturated bond described herein, unless otherwise specified, refers to a reactive unsaturated bond, such as but not limited to an unsaturated double bond with the potential of being crosslinked with other functional groups, such as an unsaturated C=C double bond with the potential of being crosslinked with other functional groups, but not limited thereto.

Unless otherwise specified, as used herein, part(s) by weight represents weight part(s) in any weight unit, such as but not limited to kilogram, gram, pound and so on. For example, 100 parts by weight of an unsaturated C═C double bond-containing polyphenylene ether resin may represent 100 kilograms of the unsaturated C═C double bond-containing polyphenylene ether resin or 100 pounds of the unsaturated C═C double bond-containing polyphenylene ether resin.

It should be understood that all features disclosed herein may be combined in any way to constitute the technical solution of the present disclosure, as long as there is no conflict present in the combination of these features.

Examples and embodiments are described in detail below. It will be understood that these examples and embodiments are exemplary only and are not intended to limit the scope and use of the present disclosure. Unless otherwise specified, processes, reagents and conditions described in the examples are those known in the art.

Generally, the present disclosure provides a resin composition, comprising the following components or a prepolymer thereof:
(A) 100 parts by weight of a polyolefin; and
(B) 10 parts by weight to 50 parts by weight of a compound of Formula (1) having a pH value of 10 or less;

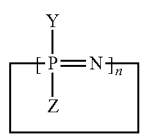

Formula (1)

in Formula (1), n is an integer of 3 to 6, each Y and Z are independently selected from o-vinylphenoxy group and phenoxy group, and each Y and Z are not phenoxy group at the same time;
wherein the prepolymer is prepared by subjecting a mixture to a prepolymerization reaction, and the mixture at least comprises the component (A) and the component (B).

For example, in one embodiment, relative to 100 parts by weight of the polyolefin, the resin composition of the present disclosure may comprise 10, 15, 20, 25, 30, 35, 40, 45 or 50 parts by weight of the compound of Formula (1) (having a pH value of 10 or less), but not limited thereto.

For example, in another embodiment, the resin composition described herein comprises a prepolymer, the prepolymer being formed by subjecting 100 parts by weight of the polyolefin and 10 parts by weight to 50 parts by weight of the compound of Formula (1) (having a pH value of 10 or less) to a prepolymerization reaction. The prepolymer of the present disclosure contains residual unsaturated C═C double bond, and the conversion rate of raw materials and the molecular weight of the prepolymer are both controlled in a preferred range. In one embodiment, the residual unsaturated C═C double bond in the prepolymer may react with other components (such as an unsaturated C═C double bond-containing crosslinking agent in the resin composition described herein, etc.), such as via a polymerization reaction or a crosslinking reaction. In the present disclosure, the presence and content of the residual unsaturated C═C double bond in the prepolymer is controlled by controlling the conversion rate of the compound of Formula (1) and the polyolefin. For example, the conversion rate of the compound of Formula (1) may be between 10% and 99%, preferably between 30% and 95%, between 50% and 95%, between 50% and 90% or between 75% and 90%. For example, a 0% conversion rate of the compound of Formula (1) represents no reaction of the compound of Formula (1) and therefore fails to form the prepolymer of the present disclosure. A 100% conversion rate of the compound of Formula (1) represents a complete reaction of the compound of Formula (1) and therefore also fails to form the prepolymer of the present disclosure. For example, the prepolymer of the present disclosure may be prepared by the method as follows: subjecting a mixture at least comprising 100 parts by weight of the polyolefin and 10 parts by weight to 50 parts by weight of the compound of Formula (1) (having a pH value of 10 or less) to a prepolymerization reaction under proper conditions. For example, the prepolymerization reaction may be performed in the presence of a curing accelerator and/or a molecular weight regulator. The type of the curing accelerator is described in detail below. In one or more embodiments, the molecular weight regulator comprises: n-butyl mercaptan, dodecyl mercaptan, mercaptoacetic acid, mercaptopropanoic acid, mercaptoethanol, 2,4-diphenyl-4-methyl-1-pentene, 4,4'-butylidenebis(6-t-butyl-3-methylphenol), 2,2'-methylenebis(4-ethyl-6-t-butylphenol) or a combination thereof. The amount of the curing accelerator and/or the molecular weight regulator suitable for the present disclosure is not particularly limited; relative to a total of 100 parts by weight of the polyolefin and the compound of Formula (1), the amount of the curing accelerator and/or the molecular weight regulator may be individually 0.01 to 5 parts by weight, such as individually 0.1 to 1 part by weight, but not limited thereto. Generally, the polyolefin, the compound of Formula (1) (having a pH value of 10 or less) and an optional curing accelerator and/or molecular weight regulator are dissolved in a solvent to proceed the prepolymerization reaction. Any solvent used in the polymerization reaction of an unsaturated C═C double bond-containing monomer or oligomer and a polyolefin is suitable for the present disclosure, including but not limited to toluene and/or methyl ethyl ketone. Temperature of the prepolymerization reaction is generally higher than the room temperature, such as between 40° C. and 140° C., preferably between 70° C. and 100° C. The reaction time is generally 0.5 to 6 hours, preferably 1 to 4 hours. The reaction is generally performed with stirring. Generally, prior to the reaction, the temperature is increased to above the room temperature, and after reacting for a while, the temperature is reduced to the room temperature (about 25° C.) to obtain a solution, which is filtered to remove impurities and to obtain a purified prepolymerization reaction product, which is the prepolymer formed by the prepolymerization reaction of the compound of Formula (1) (having a pH value of 10 or less) and the polyolefin.

The polyolefin suitable for the present disclosure is not particularly limited and may be any one or more polyolefins useful for making a prepreg, a resin film, a laminate, or a printed circuit board, such as any one or more commercial products, products prepared by the Applicant or a combination thereof. The polyolefin suitable for the present disclosure may include but are not limited to a diene polymer, a monoene polymer, a hydrogenated diene polymer or a combination thereof. The diene refers to a hydrocarbon compound containing two unsaturated C═C double bonds in the molecule, and the monoene refers to a hydrocarbon compound containing one unsaturated C═C double bond in the molecule. The polyolefin suitable for the present disclosure comprises, such as but not limited thereto, polybutadiene, polyisoprene, styrene-butadiene copolymer, styrene-isoprene copolymer, styrene-butadiene-divinylbenzene terpolymer, styrene-butadiene-maleic anhydride terpolymer, vinyl-polybutadiene-urethane oligomer, maleic anhydride-butadiene copolymer, polymethylstyrene, hydrogenated polybutadiene, hydrogenated styrene-butadiene-divinylbenzene terpolymer, hydrogenated styrene-butadiene-maleic styrene-isoprene copolymer or a combination thereof.

In some embodiments, the styrene-butadiene copolymer is preferably a styrene-butadiene random copolymer.

In some embodiments, the hydrogenated styrene-butadiene copolymer is preferably a hydrogenated styrene-butadiene block copolymer, examples including but not limited to a hydrogenated styrene-butadiene diblock copolymer or a hydrogenated styrene-butadiene-styrene triblock copolymer (SEBS).

According to the present disclosure, the compound of Formula (1) is a cyclic phosphazene compound containing P=N bonds, wherein n represents the number of P=N bonds, and n is an integer of 3 to 6. In other words, when n is 3, the compound of Formula (1) has a cyclic phosphazene structure with a six-membered ring; when n is 6, the compound of Formula (1) has a cyclic phosphazene structure with a twelve-membered ring. In addition, the phosphorus atoms in the cyclic phosphazene structure of the compound of Formula (1) may be substituted by an o-vinylphenoxy group or a phenoxy group.

o-vinylphenoxy group:

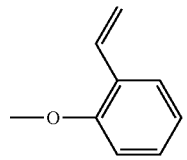

phenoxy group:

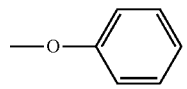

According to the present disclosure, for example, when n is 3, the number of o-vinylphenoxy groups in the cyclic phosphazene structure of the compound of Formula (1) may be 1, 2, 3, 4, 5 or 6. When n is 6, the number of o-vinylphenoxy groups in the cyclic phosphazene structure of the compound of Formula (1) may be 1, 2, 3, 4, 5, 6, 7, 8, 9, 10, 11 or 12.

According to the present disclosure, various compounds of Formula (1) may be prepared by the processes as described below, and all various compounds of Formula (1) suitable for the present disclosure have a pH value of 10 or less. According to the present disclosure, unless otherwise specified, the pH value of a compound may be measured by using a conventional instrument known in the art, such as but not limited to measured by using a pH meter or titrated by using acid-base titration. In one embodiment, for example, the compound of Formula (1) and deionized water having a pH value of 7 are mixed at a weight ratio of 1:10, and the mixture is filtered and extracted at room temperature. The pH value of the extract is measured by using a pH meter so as to obtain the pH value of the compound of Formula (1). In one embodiment, for example, the pH value of the compound of Formula (1) may be 5 to 10, such as but not limited to 5, 6, 7, 8, 9 or 10. When measured by a pH meter, the pH value of the compound of Formula (1) may also be a fractional value, such as 5.5, 6.5 or 7.3, but not limited thereto.

Relative to 100 parts by weight of the polyolefin, the resin composition disclosed herein comprises 10 parts by weight to 50 parts by weight of the compound of Formula (1) (having a pH value of 10 or less), such as but not limited to 10 parts by weight, 15 parts by weight, 20 parts by weight, 25 parts by weight, 30 parts by weight, 35 parts by weight, 40 parts by weight, 45 parts by weight or 50 parts by weight of the compound of Formula (1) (having a pH value of 10 or less).

For example, in one embodiment, the resin composition disclosed herein may further optionally comprise other components.

For example, in one embodiment, to further improve one or more properties of the article made from the resin composition, the resin composition disclosed herein may further optionally comprise a compound of Formula (2), a compound of Formula (3), a compound of Formula (4) or a combination thereof, wherein the structures of the compound of Formula (2), the compound of Formula (3) and the compound of Formula (4) are as described above, and the amounts of them are not particularly limited and may range from 0.001 part by weight to 0.5 part by weight, relative to 100 parts by weight of the polyolefin. In one embodiment, the resin composition disclosed herein may comprise 0.001 part by weight to 0.5 part by weight of a compound of Formula (2), a compound of Formula (3), a compound of Formula (4) or a combination thereof. For example, relative to 100 parts by weight of the polyolefin, the resin composition of the present disclosure may comprise 0.001, 0.003, 0.008, 0.01, 0.05, 0.1 or 0.5 part by weight of the compound of Formula (2), the compound of Formula (3) or the compound of Formula (4), but not limited thereto.

In the resin composition of the present disclosure, the compound of Formula (2) preferably comprises a compound of any one of Formula (5) to Formula (9) or a combination thereof, but not limited thereto. Unless otherwise specified, in Formula (2), the oxygen radical at the position $X_1$ and the hydroxyl group at the position $X_1$ are chemically equivalent. For example, the structure of Formula (5) and the structure of Formula (6) are equivalent to each other; that is, the structure of Formula (5) may be present as the structure of Formula (6), and the structure of Formula (6) may be present as the structure of Formula (5).

In another aspect, in the resin composition of the present disclosure, the compound of Formula (3) preferably comprises a compound of any one of Formula (10) to Formula (13) or a combination thereof, but not limited thereto. Similarly, unless otherwise specified, in Formula (3), the oxygen radical at the position $X_2$ and the hydroxyl group at the position $X_2$ are chemically equivalent.

In another aspect, in the resin composition of the present disclosure, the compound of Formula (4) preferably comprises a compound of any one of Formula (14) to Formula (15) or a combination thereof, but not limited thereto. Similarly, unless otherwise specified, in Formula (4), the oxygen radical at the position $X_3$ and the hydroxyl group at the position $X_3$ are chemically equivalent. For example, the structure of Formula (14) and the structure of Formula (15) are equivalent to each other; that is, the structure of Formula (14) may be present as the structure of Formula (15), and the structure of Formula (15) may be present as the structure of Formula (14).

In other words, as used herein, unless otherwise specified, to the compound of Formula (2), the compound of Formula (3) or the compound of Formula (4), any disclosure of embodiment or chemical structure of $X_1$ to $X_3$ being an oxygen radical is considered as the disclosure of embodiment or chemical structure of $X_1$ to $X_3$ being a hydroxyl group. For example, whenever the structure of Formula (5) is disclosed herein, it is construed as the disclosure of the structure of Formula (6), vice versa.

For example, in one embodiment, the resin composition may further comprise an unsaturated C=C double bond-containing polyphenylene ether resin. For example, in the resin composition of the present disclosure, relative to 100 parts by weight of the polyolefin, the amount of the unsaturated C=C double bond-containing polyphenylene ether resin is not particularly limited and may range from 5 parts by weight to 20 parts by weight, such as but not limited to 5 parts by weight, 10 parts by weight, 15 parts by weight or 20 parts by weight.

The unsaturated C=C double bond-containing polyphenylene ether resin suitable for the present disclosure is not particularly limited and may include any one or more unsaturated C=C double bond-containing polyphenylene ether resins useful for making a prepreg, a resin film, a laminate, or a printed circuit board, such as any one or more commercial products, products prepared by the Applicant or a combination thereof. Examples include, but not limited to, a vinylbenzyl group-containing polyphenylene ether resin, a (meth)acryloyl group-containing polyphenylene ether resin, a vinyl group-containing polyphenylene ether resin or a combination thereof.

The unsaturated C=C double bond-containing polyphenylene ether resin of the present disclosure has an unsaturated C=C double bond and a phenylene ether skeleton, wherein the unsaturated C=C double bond is a reactive group which may perform self-polymerization under heat and may also perform free radical polymerization with other components containing an unsaturated bond in the resin composition and finally result in crosslinking and curing. The cured product thereof has high thermal resistance and good dielectric properties. Preferably, the unsaturated C=C double bond-containing polyphenylene ether resin comprises an unsaturated C=C double bond-containing polyphenylene ether resin with 2,6-dimethyl substitution in its phenylene ether skeleton, wherein the methyl groups form steric hindrance to prevent the oxygen atom of the ether group from forming a hydrogen bond or Van der Waals force to absorb moisture, thereby achieving better dielectric properties.

In some embodiments, the unsaturated C=C double bond-containing polyphenylene ether resin may comprise, but not limited to, a vinylbenzyl-containing polyphenylene ether resin with a number average molecular weight of about 1200 (such as OPE-2st 1200, available from Mitsubishi Gas Chemical Co., Inc.), a vinylbenzyl-containing polyphenylene ether resin with a number average molecular weight of about 2200 (such as OPE-2st 2200, available from Mitsubishi Gas Chemical Co., Inc.), a vinylbenzyl-containing polyphenylene ether resin with a number average molecular weight of about 2400 to 2800 (such as a vinylbenzyl-containing bisphenol A polyphenylene ether resin), a (meth)acryloyl-containing polyphenylene ether resin with a number average molecular weight of about 1900 to 2300 (such as SA9000, available from Sabic), a vinyl-containing polyphenylene ether resin with a number average molecular weight of about 2200 to 3000, or a combination thereof. The vinyl-containing polyphenylene ether resin may include various polyphenylene ether resins disclosed in the US Patent Application Publication No. 20160185904A1, all of which are incorporated herein by reference in their entirety. The vinylbenzyl-containing polyphenylene ether resin may comprise, but not limited to, a vinylbenzyl-containing biphenyl polyphenylene ether resin, a vinylbenzyl-containing bisphenol A polyphenylene ether resin or a combination thereof.

For example, in one embodiment, the resin composition disclosed herein may further optionally comprise other unsaturated C=C double bond-containing crosslinking agents. The unsaturated C=C double bond-containing crosslinking agent used in the present disclosure is not particularly limited and may include any one or more unsaturated C=C double bond-containing crosslinking agents useful for making a prepreg, a resin film, a laminate or a printed circuit board. For example, the unsaturated C=C double bond-containing crosslinking agent may comprise 1,2-bis(vinylphenyl)ethane, bis(vinylbenzyl)ether, divinylbenzene, divinylnaphthalene, divinylbiphenyl, t-butyl styrene, triallyl isocyanurate, triallyl cyanurate, 1,2,4-trivinyl cyclohexane, diallyl bisphenol A, styrene, butadiene, decadiene, octadiene, vinylcarbazole, acrylate or a combination thereof. Unless otherwise specified, the unsaturated C=C double bond-containing crosslinking agent should be construed as including isomers or prepolymers of these components. The amount of the unsaturated C=C double bond-containing crosslinking agent is not particularly limited; for example, relative to 100 parts by weight of the polyolefin, the amount of the unsaturated C=C double bond-containing crosslinking agent may be 5 parts by weight to 30 parts by weight, but not limited thereto. Preferably, the amount of the unsaturated C=C double bond-containing crosslinking agent is 5 parts by weight to 10 parts by weight.

For example, in one embodiment, the resin composition disclosed herein may further optionally comprise a benzoxazine resin, an epoxy resin, a polyester resin, a phenolic resin, an amine curing agent, a polyamide, a polyimide, a styrene maleic anhydride, a maleimide resin, a cyanate ester, a maleimide triazine resin or a combination thereof.

According to the present disclosure, for example, the benzoxazine resin may be any benzoxazine resins known in the field to which this disclosure pertains. Examples include but are not limited to bisphenol A benzoxazine resin, bisphenol F benzoxazine resin, phenolphthalein benzoxazine resin, dicyclopentadiene benzoxazine resin, phosphorus-containing benzoxazine resin, diamino benzoxazine resin and phenyl group-modified, vinyl group-modified or allyl group-modified benzoxazine resin. Commercially available products include LZ-8270 (phenolphthalein benzoxazine resin), LZ-8298 (phenolphthalein benzoxazine resin), LZ-8280 (bisphenol F benzoxazine resin) and LZ-8290 (bisphenol A benzoxazine resin) available from Huntsman, and KZH-5031 (vinyl group-modified benzoxazine resin) and KZH-5032 (phenyl group-modified benzoxazine resin) available from Kolon Industries Inc. The diamino benzoxazine resin may be diaminodiphenylmethane benzoxazine resin, diaminodiphenyl ether benzoxazine resin, diaminodiphenyl sulfone benzoxazine resin, diaminodiphenyl sulfide benzoxazine resin or a combination thereof, but not limited thereto.

Unless otherwise specified, the amount of the benzoxazine resin used in the present disclosure may be adjusted as needed; for example, but not limited thereto, relative to 100 parts by weight of the polyolefin, the amount of the benzoxazine resin may be 10 to 100 parts by weight, such as 10 parts by weight, 15 parts by weight, 20 parts by weight, 30 parts by weight, 40 parts by weight, 50 parts by weight, 60 parts by weight, 70 parts by weight, 80 parts by weight, 90 parts by weight or 100 parts by weight.

According to the present disclosure, for example, the epoxy resin may be any epoxy resins known in the field to which this disclosure pertains; in terms of improving the thermal resistance of the resin composition, the epoxy resin may include, but not limited to, bisphenol A epoxy resin, bisphenol F epoxy resin, bisphenol S epoxy resin, bisphenol AD epoxy resin, novolac epoxy resin, trifunctional epoxy resin, tetrafunctional epoxy resin, multifunctional novolac epoxy resin, dicyclopentadiene (DCPD) epoxy resin, phosphorus-containing epoxy resin, p-xylene epoxy resin, naphthalene epoxy resin (e.g., naphthol epoxy resin), benzofuran epoxy resin, isocyanate-modified epoxy resin, or a combination thereof. The novolac epoxy resin may be phenol novolac epoxy resin, bisphenol A novolac epoxy resin, bisphenol F novolac epoxy resin, biphenyl novolac epoxy resin, phenol benzaldehyde epoxy resin, phenol aralkyl novolac epoxy resin or o-cresol novolac epoxy resin. The phosphorus-containing epoxy resin may be DOPO (9,10-dihydro-9-oxa-10-phosphaphenanthrene-10-oxide) epoxy resin, DOPO-HQ epoxy resin or a combination thereof. The DOPO epoxy resin may be any one or more selected from DOPO-containing phenol novolac epoxy resin, DOPO-containing o-cresol novolac epoxy resin and DOPO-containing bisphenol-A novolac epoxy resin; the DOPO-HQ epoxy resin may be any one or more selected from DOPO-HQ-containing phenol novolac epoxy resin, DOPO-HQ-containing o-cresol novolac epoxy resin and DOPO-HQ-containing bisphenol-A novolac epoxy resin, but not limited thereto.

Unless otherwise specified, the amount of the epoxy resin used in the present disclosure may be adjusted as needed; for example, but not limited thereto, relative to 100 parts by weight of the polyolefin, the amount of the epoxy resin may be 10 to 100 parts by weight, such as 10 parts by weight, 15 parts by weight, 20 parts by weight, 30 parts by weight, 40 parts by weight, 50 parts by weight, 60 parts by weight, 70 parts by weight, 80 parts by weight, 90 parts by weight or 100 parts by weight.

According to the present disclosure, for example, the polyester resin may be any polyester resins known in the field to which this disclosure pertains. Examples include but are not limited to a dicyclopentadiene-containing polyester resin and a naphthalene-containing polyester resin. Examples include, but not limited to, HPC-8000 or HPC-8150 available from D.I.C. Corporation. Unless otherwise specified, the amount of the polyester resin used in the present disclosure may be adjusted as needed; for example, but not limited thereto, relative to 100 parts by weight of the polyolefin, the amount of the polyester resin may be 10 to 80 parts by weight, such as 10 parts by weight, 15 parts by weight, 20 parts by weight, 30 parts by weight, 40 parts by weight, 50 parts by weight, 60 parts by weight, 70 parts by weight or 80 parts by weight.

According to the present disclosure, for example, the phenolic resin may be any phenolic resins known in the field to which this disclosure pertains, examples including but not limited to phenoxy resin or novolac resin (such as phenol novolac resin, naphthol novolac resin, biphenyl novolac resin, and dicyclopentadiene phenol resin), but not limited thereto. Unless otherwise specified, the amount of the phenolic resin used in the present disclosure may be adjusted as needed; for example, but not limited thereto, relative to 100 parts by weight of the polyolefin, the amount of the phenolic resin may be 10 to 80 parts by weight, such as 10 parts by weight, 15 parts by weight, 20 parts by weight, 30 parts by weight, 40 parts by weight, 50 parts by weight, 60 parts by weight, 70 parts by weight or 80 parts by weight.

According to the present disclosure, for example, the amine curing agent may be any amine curing agents known in the field to which this disclosure pertains. Examples include but are not limited to any one or a combination of diamino diphenyl sulfone, diamino diphenyl methane, diamino diphenyl ether, diamino diphenyl sulfide and dicyandiamide. Unless otherwise specified, the amount of the amine curing agent used in the present disclosure may be adjusted as needed; for example, but not limited thereto, relative to 100 parts by weight of the polyolefin, the amount of the amine curing agent may be 1 to 15 parts by weight, such as 1 part by weight, 4 parts by weight, 7.5 parts by weight, 12 parts by weight or 15 parts by weight.

According to the present disclosure, for example, the polyamide may be any polyamides known in the field to which this disclosure pertains, including but not limited to various commercially available polyamide resin products.

According to the present disclosure, for example, the polyimide may be any polyimides known in the field to which this disclosure pertains, including but not limited to various commercially available polyimide resin products.

According to the present disclosure, for example, styrene maleic anhydride may be any styrene maleic anhydrides known in the field to which this disclosure pertains, wherein the ratio of styrene (S) to maleic anhydride (MA) may be for example 1/1, 2/1, 3/1, 4/1, 6/1, 8/1 or 12/1, examples including styrene maleic anhydride copolymers such as SMA-1000, SMA-2000, SMA-3000, EF-30, EF-40, EF-60 and EF-80 available from Cray Valley, or styrene maleic anhydride copolymers such as C400, C500, C700 and C900 available from Polyscope, but not limited thereto.

For example, the maleimide resin used herein may include products such as BMI-1000, BMI-1000H, BMI-1100, BMI-1100H, BMI-2000, BMI-2300, BMI-3000, BMI-3000H, BMI-4000H, BMI-5000, BMI-5100, BMI-7000 and BMI-7000H available from Daiwakasei Industry Co., Ltd., or products such as BMI-70 and BMI-80 available from K.I Chemical Industry Co., Ltd. For example, the maleimide resin disclosed herein may be a maleimide resin containing aliphatic long-chain structure. The maleimide resin containing aliphatic long-chain structure may include products such as BMI-689, BMI-1400, BMI-1500, BMI-1700, BMI-2500, BMI-3000, BMI-5000 and BMI-6000 available from Designer Molecules Inc.

According to the present disclosure, for example, the cyanate ester may include any one or more cyanate ester resins useful for preparing a prepreg, a resin film, a laminate or a printed circuit board, such as a compound having an Ar—O—C≡N structure, wherein Ar may be a substituted or unsubstituted aromatic group. In terms of improving the thermal resistance of the resin composition, examples of the cyanate ester resin include but are not limited to novolac cyanate ester resin, bisphenol A cyanate ester resin, bisphenol F cyanate ester resin, dicyclopentadiene-containing cyanate ester resin, naphthalene-containing cyanate ester resin, phenolphthalein cyanate ester resin, adamantane cyanate ester resin, fluorene cyanate ester resin or a combination thereof. The novolac cyanate ester resin may be bisphenol A novolac cyanate ester resin, bisphenol F novolac cyanate ester resin or a combination thereof. For example, the cyanate ester resin may be available under the product name Primaset PT-15, PT-30S, PT-60S, BA-200, BA-230S, BA-3000S, BTP-2500, BTP-6020S, DT-4000, DT-7000, ULL950S, HTL-300, CE-320, LUT-50, or LeCy sold by Lonza.

For example, unless otherwise specified, the maleimide triazine resin used in the present disclosure is not particularly limited and may include any one or more maleimide triazine resins useful for preparing a prepreg, a resin film, a laminate or a printed circuit board. For example, the maleimide triazine resin may be obtained by polymerizing the aforesaid cyanate ester resin and the aforesaid maleimide resin. For example, the maleimide triazine resin may be obtained by polymerizing bisphenol A cyanate ester resin and maleimide resin, by polymerizing bisphenol F cyanate ester resin and maleimide resin, by polymerizing phenol novolac cyanate ester resin and maleimide resin or by polymerizing dicyclopentadiene-containing cyanate ester resin and maleimide resin, but not limited thereto. For example, the maleimide triazine resin may be obtained by polymerizing the cyanate ester resin and the maleimide resin at any molar ratio. For example, relative to 1 mole of the maleimide resin, 1 to 10 moles of the cyanate ester resin may be used. For example, relative to 1 mole of the maleimide resin, 1, 2, 4, or 6 moles of the cyanate ester resin may be used, but not limited thereto.

For example, in one embodiment, the resin composition disclosed herein may further optionally comprise flame retardant, curing accelerator, inorganic filler, surface treating agent, coloring agent, solvent, toughening agent or a combination thereof.

For example, a suitable flame retardant may be any one or more flame retardants used for preparing a prepreg, a resin film, a laminate or a printed circuit board, including but not limited to a phosphorus-containing flame retardant or a bromine-containing flame retardant. The bromine-containing flame retardant preferably comprises decabromodiphenyl ethane, and the phosphorus-containing flame retardant preferably comprises: ammonium polyphosphate, hydroquinone bis-(diphenyl phosphate), bisphenol A bis-(diphenylphosphate), tri(2-carboxyethyl) phosphine (TCEP), phosphoric acid tris(chloroisopropyl) ester, trimethyl phosphate (TMP), dimethyl methyl phosphonate (DMMP), resorcinol bis(dixylenyl phosphate) (RDXP, such as commercially available PX-200, PX-201 and PX-202), melamine polyphosphate, DPPO (diphenylphosphine oxide) and its derivatives (such as di-DPPO compounds) or resins, melamine cyanurate, tri-hydroxy ethyl isocyanurate, aluminium phosphinate (e.g., commercially available OP-930 and OP-935) or a combination thereof.

In one embodiment, for example, the flame retardant may also be a flame retardant commercially available from Katayama Chemical Industries Co., Ltd., such as but not limited to V1, V2, V3, V4, V5, V7, S-2, S-4, E-4c, E-7c, E-8g, E-9g, E-10g, E-100, B-3, W-1o, W-2h, W-2o, W-3o, W-4o, OX-1, OX-2, OX-4, OX-6, OX-6+, OX-7, OX-7+, OX-13, BPE-1, BPE-3, HyP-2, API-9, CMPO, ME-20, C-1R, C-1S, C-3R, C-3S or C-11R. The flame retardant of the present disclosure may include one or more of the above flame retardants.

The flame retardant of the present disclosure preferably includes RDXP (e.g., commercially available PX-200, PX-201 and PX-202) and flame retardants commercially available from Katayama Chemical Industries Co., Ltd., such as a flame retardant under the product name S-2.

In one embodiment, for example, the curing accelerator (including curing initiator) suitable for the present disclosure may comprise a catalyst, such as a Lewis base or a Lewis acid. The Lewis base may comprise any one or more of imidazole, boron trifluoride-amine complex, ethyltriphenyl phosphonium chloride, 2-methylimidazole (2MI), 2-phenyl-1H-imidazole (2PZ), 2-ethyl-4-methylimidazole (2E4MI), triphenylphosphine (TPP) and 4-dimethylaminopyridine (DMAP). The Lewis acid may comprise metal salt compounds, such as those of manganese, iron, cobalt, nickel, copper and zinc, such as zinc octanoate or cobalt octanoate. The curing accelerator also includes a curing initiator, such as a peroxide capable of producing free radicals, examples of curing initiator including but not limited to dicumyl peroxide, tert-butyl peroxybenzoate, dibenzoyl peroxide (BPO), 2,5-dimethyl-2,5-di(tert-butyl peroxy)-3-hexyne (25B), bis(tert-butylperoxyisopropyl)benzene or a combination thereof.

In one embodiment, for example, the inorganic filler suitable for the present disclosure may include, but not limited to, silica (fused, non-fused, porous or hollow type), aluminum oxide, aluminum hydroxide, magnesium oxide, magnesium hydroxide, calcium carbonate, aluminum nitride, boron nitride, aluminum silicon carbide, silicon carbide, titanium dioxide, barium titanate, lead titanate, strontium titanate, calcium titanate, magnesium titanate, barium zirconate, lead zirconate, magnesium zirconate, lead zirconate titanate, zinc molybdate, calcium molybdate, magnesium molybdate, zinc molybdate-modified talc, zinc oxide, zirconium oxide, mica, boehmite (AlOOH), calcined talc, talc, silicon nitride, calcined kaolin, or a combination thereof. Moreover, the inorganic filler can be spherical (including solid sphere or hollow sphere), fibrous, plate-like, particulate, flake-like or whisker-like and can be optionally pretreated by an unsaturated bond-containing compound or a silane coupling agent.

In one embodiment, for example, the surface treating agent suitable for the present disclosure comprises silane coupling agent, organosilicon oligomer, titanate coupling agent or a combination thereof. The addition of the surface treating agent may promote the dispersivity of the inorganic filler and the compatibility with resin components. For example, the silane coupling agent may comprise silane (such as but not limited to siloxane), which may be further categorized according to the functional groups into amino silane, epoxy silane, vinyl silane, ester silane, hydroxyl silane, isocyanate silane, methacryloxy silane and acryloxy silane. Preferably, vinyl silane, methacryloxy silane or acryloxy silane is used for surface treatment.

In one embodiment, for example, the coloring agent suitable for the present disclosure may comprise, but not limited to, dye or pigment.

In one embodiment, for example, the solvent suitable for the present disclosure may comprise, but not limited to, methanol, ethanol, ethylene glycol monomethyl ether, acetone, butanone (a.k.a. methyl ethyl ketone), methyl isobutyl ketone, cyclohexanone, N-methyl-pyrrolidone, toluene, xylene, methoxyethyl acetate, ethoxyethyl acetate, propoxyethyl acetate, ethyl acetate, dimethylformamide, dimethylacetamide, propylene glycol methyl ether, or a mixture thereof.

In addition to the aforesaid components, the resin composition disclosed herein may optionally further comprise a toughening agent. In one embodiment, for example, the toughening agent comprises, but not limited to, core-shell rubber, ethylene propylene rubber or a combination thereof.

Unless otherwise specified, the ratio or content of different optional components in the resin composition of the present disclosure may be adjusted according to needs.

The resin composition of various embodiments may be processed to make different articles, such as those suitable for use as components in electronic products, including but not limited to a prepreg, a resin film, a laminate or a printed circuit board.

For example, the resin composition according to each of the various embodiments disclosed herein may be used to make a prepreg, which has a reinforcement material and a layered structure formed thereon, wherein the layered structure is made by heating the resin composition at high temperature to a semi-cured state (B-stage). Suitable baking temperature for making the prepreg may be for example 120° C. to 180° C. For example, the reinforcement material may be any one of a fiber material, woven fabric, and non-woven fabric, and the woven fabric preferably comprises fiberglass fabrics. Types of fiberglass fabrics are not particularly limited and may be any commercial fiberglass fabric useful for various printed circuit boards, such as E-glass fiber fabric, D-glass fiber fabric, S-glass fiber fabric, T-glass fiber fabric, L-glass fiber fabric or Q-glass fiber fabric, wherein the fiber may comprise yarns and rovings, in spread form or standard form. Non-woven fabric preferably comprises liquid crystal polymer non-woven fabric, such as polyester non-woven fabric, polyurethane non-woven fabric and so on, but not limited thereto. Woven fabric may also comprise liquid crystal polymer woven fabric, such as polyester woven fabric, polyurethane woven fabric and so on, but not limited thereto. The reinforcement material may increase the mechanical strength of the prepreg. In one preferred embodiment, the reinforcement material can be optionally pre-treated by a silane coupling agent. The prepreg may be further heated and cured to the C-stage to form an insulation layer.

In one embodiment, by well mixing each resin composition to form a varnish, loading the varnish into an impregnation tank, impregnating a fiberglass fabric into the impregnation tank to adhere the resin composition onto the fiberglass fabric, and proceeding with heating and baking at a proper temperature to a semi-cured state, a prepreg may be obtained.

For example, the resin composition from each embodiment of the present disclosure can be used to make a resin film, which is prepared by heating and baking the resin composition to the semi-cured state. For example, by selectively coating the resin composition from each embodiment of the present disclosure on a liquid crystal polymer film, a polytetrafluoroethylene film, a polyethylene terephthalate film (PET film) or a polyimide film, followed by heating and baking at a proper temperature to a semi-cured state, a resin film may be obtained. For example, the resin composition from each embodiment may be coated on a copper foil to uniformly adhere the resin composition thereon, followed by heating and baking at a proper temperature to a semi-cured state to obtain the resin film.

For example, the resin composition from each embodiment of the present disclosure may be made into a laminate, which comprises at least two metal foils and at least one insulation layer disposed between the metal foils, wherein the insulation layer is made by curing the resin composition at high temperature and high pressure to the C-stage, a suitable curing temperature being for example between 150° C. and 320° C. and preferably between 180° C. and 250° C. and a suitable curing time being 100 to 300 minutes and preferably 120 to 250 minutes. The insulation layer may be obtained by curing the aforesaid prepreg or resin film. The metal foil may contain copper, aluminum, nickel, platinum, silver, gold or alloy thereof, such as a copper foil. In a preferred embodiment, the laminate is a copper-clad laminate.

For example, the resin compositions of various embodiments of the present disclosure may be used to make a printed circuit board. In one embodiment of making the printed circuit board according to the present disclosure, a double-sided copper-clad laminate (such as product EM-827, available from Elite Material Co., Ltd.) with a thickness of 28 mil and having 1-ounce (oz) HTE (high temperature elongation) copper foils may be used and subject to drilling and then electroplating, so as to form electrical conduction between the top layer copper foil and the bottom layer copper foil. Then the top layer copper foil and the bottom layer copper foil are etched to form inner layer circuits. Then brown oxidation and roughening are performed on the inner layer circuits to form uneven structures on the surface to increase roughness. Next, a vacuum lamination apparatus is used to laminate the assembly of a copper foil, the prepreg, the inner layer circuit board, the prepreg and a copper foil stacked in said order by heating at 180° C. to 320° C. for 100 to 300 minutes to cure the insulation material of the prepregs. Next, black oxidation, drilling, copper plating and other known circuit board processes are performed on the outmost copper foils so as to obtain the printed circuit board.

Preferably, the resin composition disclosed herein or the article made therefrom achieves improvements in one or more properties including resin filling uniformity, dissipation factor variation rate under heat, glass transition temperature, Z-axis ratio of thermal expansion, peeling strength and thermal resistance after moisture absorption.

For example, the resin composition according to the present disclosure or the article made therefrom may achieve one, more or all of the following properties:
  absence of patterns on the copper-free surface of the inner layer wiring laminate without surface copper;
  a dissipation factor variation rate under heat of less than or equal to 30% calculated according to a dissipation factor as measured by reference to JIS C2565 at 10 GHz after being subject to standing still at 188° C. for 48 hours, such as a dissipation factor variation rate under heat of between 16% and 30%;
  a glass transition temperature as measured by reference to IPC-TM-650 2.4.24.4 of greater than or equal to 225° C., such as a glass transition temperature of between 225° C. and 243° C.;
  a Z-axis ratio of thermal expansion as measured by reference to IPC-TM-650 2.4.24.5 of less than or equal to 1.52%, such as a Z-axis ratio of thermal expansion of between 1.28% and 1.52%;
  a peeling strength as measured by reference to IPC-TM-650 2.4.8 of greater than or equal to 3.3 lb/in, such as a peeling strength of between 3.3 lb/in and 3.9 lb/in; and
  no delamination occurs after subjecting the article to a thermal resistance after moisture absorption test by reference to IPC-TM-650 2.6.16.1 and IPC-TM-650 2.4.23.

Raw materials below were used to prepare the resin compositions of various Examples and Comparative Examples of the present disclosure according to the amount listed in Table 1 to Table 3 and further fabricated to prepare test samples.

Materials and reagents used in Examples and Comparative Examples disclosed herein are listed below:
  G1726: hydrogenated styrene-butadiene-styrene triblock copolymer (SEBS), available from Kraton Corporation.
  B-3000: polybutadiene, available from Nippon Soda Co., Ltd.
  Ricon 100: styrene-butadiene random copolymer, available from Cray Valley.

Ricon 184MA6: styrene-butadiene-maleic anhydride terpolymer, available from Cray Valley.

Compounds of Formula (1) A1-A6: prepared by the Applicant, as described in detail below.

Prepolymers 1-2: prepared by the Applicant, as described in detail below.

SA9000: methacryloyl group-containing polyphenylene ether resin, available from Sabic.

OPE-2st 2200: vinylbenzyl group-containing polyphenylene ether resin, available from Mitsubishi Gas Chemical Co., Inc.

DVB: divinylbenzene, available from Shanghai Macklin Biochemical Co., Ltd.

TAIC: triallyl isocyanurate, available from Kingyorker Enterprise Co., Ltd.

Compound B, Compound C and Compound D: prepared by the Applicant, as described in detail below.

SPV-100: allyl group-containing phosphazene, available from Otsuka Chemical Co., Ltd.

Di-DOPO: di-9,10-dihydro-9-oxa-10-phospha-phenanthrene-10-oxide, as shown below.

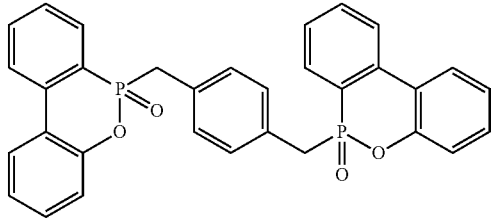 [SMILES: O=P1(Cc2ccc(CP3(=O)Oc4ccccc4-c4ccccc43)cc2)Oc2ccccc2-c2ccccc21]

PX-200: 1,3-phenylene tetrakis(2,6-dimethylphenyl) diphosphate (condensation polymer), available from Daihachi Chemical Industry Co., Ltd.

S-2: diethyl p-vinylbenzyl phosphate, available from Katayama Chemical Industries Co., Ltd.

Compound A7: prepared by the Applicant, as described in detail below.

Compound B1: compound of Formula (5), available from Changzhou Jiana Chemical Co., Ltd.

Compound B2: compound of Formula (7), available from Changzhou Yipintang Chemical Co., Ltd.

Compound C1: compound of Formula (10), available from Changzhou Yipintang Chemical Co., Ltd.

Compound C2: compound of Formula (11), available from Changzhou Yipintang Chemical Co., Ltd.

Compound D1: compound of Formula (15), available from Wuxi FuAn Chemical Plant.

SC-2500-SVJ: inorganic filler, spherical silica pre-treated by silane coupling agent, available from Admatechs.

25B: curing initiator, 2,5-dimethyl-2,5-di(t-butylperoxy)-3-hexyne, available from NOF Corporation.

Toluene: solvent, available from Sinopec Group. The amount of toluene is shown as "PA" in the Tables to indicate a "proper amount" to represent an amount of toluene used to achieve a 65% solid content (S/C=65%) of the whole resin composition.

Preparation Examples of Chemical Reagents

Self-Prepared Compound A1:

31.2 g of NaH and 400 mL of anhydrous THF (tetrahydrofuran) were added to a 1 L three-necked flask in the presence of $N_2$, and the temperature was increased to 50° C. with stirring; 97.7 g of o-hydroxybenzaldehyde was dissolved in 200 mL of anhydrous THF, which was added slowly to the three-necked flask. The reaction was continued after the addition for 4 hours, and 34.7 g of hexachlorocyclotriphosphazene was dissolved in 200 mL of anhydrous THF, added to the three-necked flask, followed by increasing the temperature to 65° C. and reacting for 48 hours, centrifuged, filtered for several times and dried to obtain an intermediate.

The reaction is extremely sensitive to oxygen and water in the air; therefore, it needs to be carried out in a dry and inert atmosphere, and it requires higher demands in drying of the container and the solvent. Dried methyl triphenylphosphonium bromide (excess, 150%) and calcium hydride (excess, 150%) were added to anhydrous THF, followed by adding the intermediate. After the reaction was completed, acetic acid was added with stirring for 1 hour, and the mixture was filtered to obtain the self-prepared Compound A1, wherein 95% of which has the structure of Formula (1), n=3, having a pH of 8, and both Y and Z are o-vinylphenoxy groups, and the total number of Y and Z is 6. Self-prepared Compound A1 is shown below:

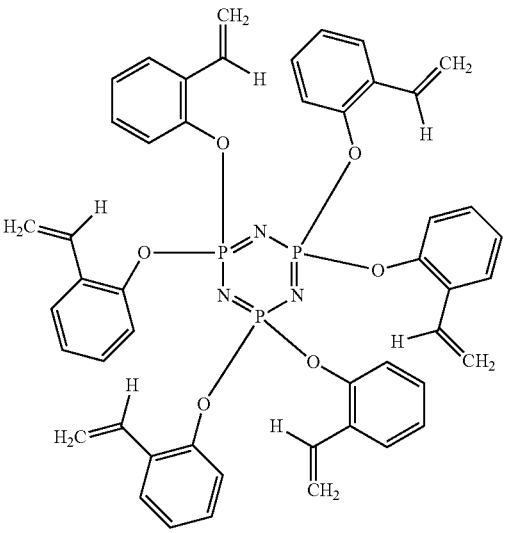 [SMILES: C=Cc1ccccc1OP1(Oc2ccccc2C=C)=NP(Oc2ccccc2C=C)(Oc2ccccc2C=C)=NP(Oc2ccccc2C=C)(Oc2ccccc2C=C)=N1]

Unless otherwise specified, according to the present disclosure, the measurement of the pH value of the compound is described as follows: a compound and deionized water with a pH value of 7 were mixed in a weight ratio of 1:10, and the mixture was filtered and extracted at room temperature. The pH value of the extract was measured as the pH value of the compound by using a pH meter.

Self-Prepared Compound A2:

31.2 g of NaH and 400 mL of anhydrous THF were added to a 1 L three-necked flask in the presence of $N_2$, and the temperature was increased to 50° C. with stirring; 97.7 g of o-hydroxybenzaldehyde was dissolved in 200 mL of anhydrous THF, which was added slowly to the three-necked flask. The reaction was continued after the addition for 4 hours, and 34.7 g of hexachlorocyclotriphosphazene was dissolved in 200 mL of anhydrous THF, added to the three-necked flask, followed by increasing the temperature to 65° C. and reacting for 48 hours, centrifuged, filtered for several times and dried to obtain an intermediate.

The reaction is extremely sensitive to oxygen and water in the air; therefore, it needs to be carried out in a dry and inert atmosphere, and it requires higher demands in drying of the container and the solvent. Dried methyl triphenylphosphonium bromide (excess, 150%) and calcium hydride (excess, 160%) were added to anhydrous THF, followed by adding the intermediate. After the reaction was completed, acetic acid was added with stirring for 1 hour, and the mixture was filtered to obtain the self-prepared Compound A2, wherein 90% of which has the structure of Formula (1), n=3, having a pH of 10, and both Y and Z are o-vinylphenoxy groups, and the total number of Y and Z is 6.

Self-Prepared Compound A3:

31.2 g of NaH and 400 mL of anhydrous THF were added to a 1 L three-necked flask in the presence of $N_2$, and the temperature was increased to 50° C. with stirring; 97.7 g of o-hydroxybenzaldehyde was dissolved in 200 mL of anhydrous THF, which was added slowly to the three-necked flask. The reaction was continued after the addition for 4 hours, and 34.7 g of hexachlorocyclotriphosphazene was dissolved in 200 mL of anhydrous THF, added to the three-necked flask, followed by increasing the temperature to 65° C. and reacting for 48 hours, centrifuged, filtered for several times and dried to obtain an intermediate.

The reaction is extremely sensitive to oxygen and water in the air; therefore, it needs to be carried out in a dry and inert atmosphere, and it requires higher demands in drying of the container and the solvent. Dried methyl triphenylphosphonium bromide (excess, 150%) and calcium hydride (excess, 130%) were added to anhydrous THF, followed by adding the intermediate. After the reaction was completed, acetic acid was added with stirring for 1 hour, and the mixture was filtered to obtain the self-prepared Compound A3, wherein 100% of which has the structure of Formula (1), n=3, having a pH of 5, and both Y and Z are o-vinylphenoxy groups, and the total number of Y and Z is 6.

Self-Prepared Compound A4:

62.4 g of NaH and 400 mL of anhydrous THF were added to a 1 L three-necked flask in the presence of $N_2$, and the temperature was increased to 50° C. with stirring; 195.4 g of o-hydroxybenzaldehyde was dissolved in 200 mL of anhydrous THF, which was added slowly to the three-necked flask. The reaction was continued after the addition for 4 hours, and 69.4 g of dodecachlorocyclophosphazene was dissolved in 200 mL of anhydrous THF, added to the three-necked flask, followed by increasing the temperature to 65° C. and reacting for 48 hours, centrifuged, filtered for several times and dried to obtain an intermediate.

The reaction is extremely sensitive to oxygen and water in the air; therefore, it needs to be carried out in a dry and inert atmosphere, and it requires higher demands in drying of the container and the solvent. Dried methyl triphenylphosphonium bromide (excess, 150%) and calcium hydride (excess, 150%) were added to anhydrous THF, followed by adding the intermediate. After the reaction was completed, acetic acid was added with stirring for 1 hour, and the mixture was filtered to obtain the self-prepared Compound A4, wherein 95% of which has the structure of Formula (1), n=6, having a pH of 8, and both Y and Z are o-vinylphenoxy groups, and the total number of Y and Z is 12.

Self-Prepared Compound A5:

31.2 g of NaH and 400 mL of anhydrous THF were added to a 1 L three-necked flask in the presence of $N_2$, and the temperature was increased to 50° C. with stirring; 97.7 g of o-hydroxybenzaldehyde was dissolved in 200 mL of anhydrous THF, which was added slowly to the three-necked flask. The reaction was continued after the addition for 4 hours, and 34.7 g of hexachlorocyclotriphosphazene was dissolved in 200 mL of anhydrous THF, added to the three-necked flask, followed by increasing the temperature to 65° C. and reacting for 48 hours, centrifuged, filtered for several times and dried to obtain an intermediate.

The reaction is extremely sensitive to oxygen and water in the air; therefore, it needs to be carried out in a dry and inert atmosphere, and it requires higher demands in drying of the container and the solvent. Dried methyl triphenylphosphonium bromide (excess, 150%) and calcium hydride (excess, 180%) were added to anhydrous THF, followed by adding the intermediate. After the reaction was completed, acetic acid was added with stirring for 1 hour, and the mixture was filtered to obtain the self-prepared Compound A5, wherein 75% of which has the structure of Formula (1), n=3, having a pH of 12, and both Y and Z are o-vinylphenoxy groups, and the total number of Y and Z is 6.

Self-Prepared Compound A6:

31.2 g of NaH and 400 mL of anhydrous THF were added to a 1 L three-necked flask in the presence of $N_2$, and the temperature was increased to 50° C. with stirring; 48.85 g of o-hydroxybenzaldehyde and 37.6 g of phenol were dissolved in 200 mL of anhydrous THF, which was added slowly to the three-necked flask. The reaction was continued after the addition for 4 hours, and 34.7 g of hexachlorocyclotriphosphazene was dissolved in 200 mL of anhydrous THF, added to the three-necked flask, followed by increasing the temperature to 65° C. and reacting for 48 hours, centrifuged, filtered for several times and dried to obtain an intermediate.

The reaction is extremely sensitive to oxygen and water in the air; therefore, it needs to be carried out in a dry and inert atmosphere, and it requires higher demands in drying of the container and the solvent. Dried methyl triphenylphosphonium bromide (excess, 150%) and calcium hydride (excess, 140%) were added to anhydrous THF, followed by adding the intermediate. After the reaction was completed, acetic acid was added with stirring for 1 hour, and the mixture was filtered to obtain the self-prepared Compound A6, wherein 95% of which has the structure of Formula (1), n=3, having a pH of 8, wherein Y is o-vinylphenoxy group, Z is phenoxy group, the number of Y and Z is 3 respectively, and the total number of Y and Z is 6.

Self-Prepared Prepolymer 1:

Under stirring, to 120 parts by weight of the toluene solvent were added 120 parts by weight of B-3000 and 12 parts by weight of the self-prepared Compound A1, followed by adding 0.12 part by weight of peroxide (BPO) as the prepolymerization initiator, and the reaction was performed under continuous stirring at 70° C. for 1 hour; after the reaction was completed, the solution was cooled, filtrated and purified to obtain the self-prepared Prepolymer 1, having a solid content of 100% and a conversion rate of the self-prepared Prepolymer 1 of between 10% and 99%.

Self-Prepared Prepolymer 2:

The self-prepared Prepolymer 2 was prepared according to the processes described in the preparation of the self-prepared Prepolymer 1, except that 80 parts by weight of B-3000, 40 parts by weight of Ricon 100, and 60 parts by weight of the self-prepared Compound A1 were used to finally obtain the self-prepared Prepolymer 2, having a solid content of 100% and a conversion rate of self-prepared Prepolymer 2 of between 10% and 99%.

Self-Prepared Compound B:

4-allyloxy-4'-hydroxydiphenyl sulfone and sodium were used as the main raw materials and added to tetrahydrofuran at 25° C. for performing a substitution reaction to obtain 4-allyloxy-4'-oxysodiumdiphenyl sulfone, followed by adding a proper amount of hexachlorocyclotriphosphazene and tetrahydrofuran, eliminating NaCl at 60° C. to obtain Compound B, as shown below.

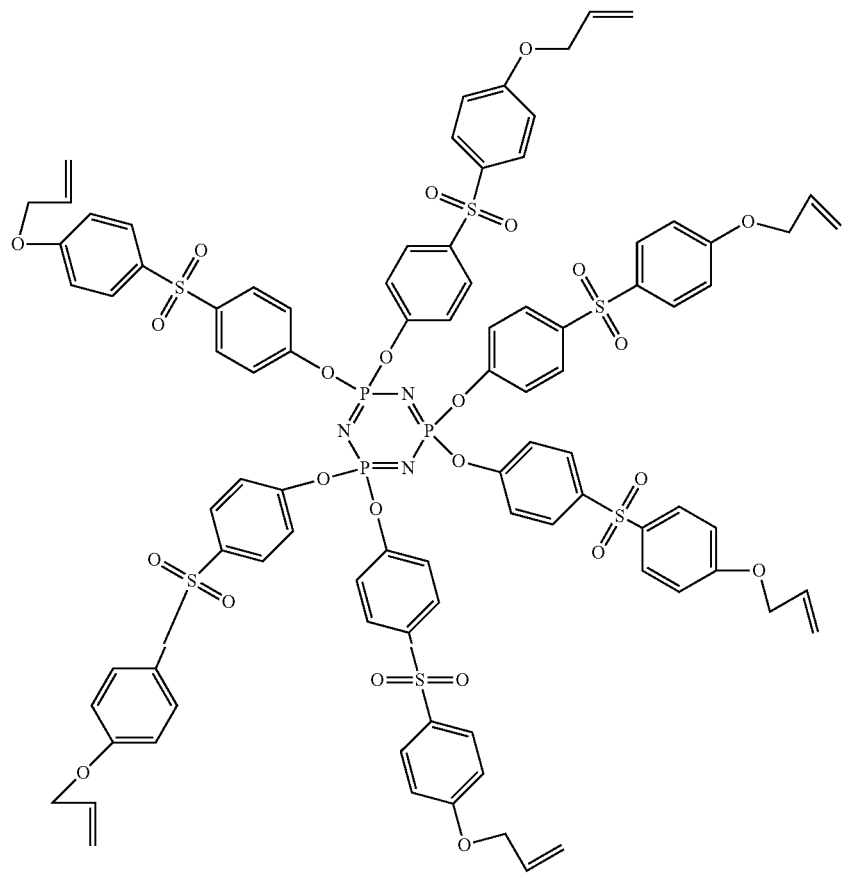 [SMILES: C=CCOc1ccc(S(=O)(=O)c2ccc(OP3(Oc4ccc(S(=O)(=O)c5ccc(OCC=C)cc5)cc4)=NP(Oc4ccc(S(=O)(=O)c5ccc(OCC=C)cc5)cc4)(Oc4ccc(S(=O)(=O)c5ccc(OCC=C)cc5)cc4)=NP(Oc4ccc(S(=O)(=O)c5ccc(OCC=C)cc5)cc4)(Oc4ccc(S(=O)(=O)c5ccc(OCC=C)cc5)cc4)=N3)cc2)cc1]

Self-Prepared Compound C:

Hexachlorocyclotriphosphazene, p-vinylphenol and phenol were used as the main raw materials for performing a two-step nucleophilic substitution by dropwise addition to synthesize p-vinylphenylcyclotriphosphazene compound, which is Compound C, as shown below.

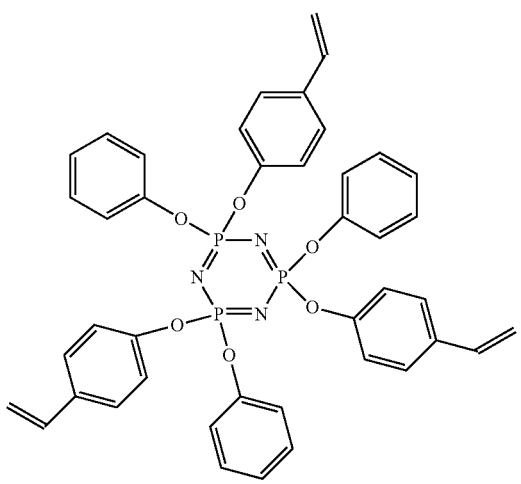 [SMILES: C=Cc1ccc(OP2(Oc3ccccc3)=NP(Oc3ccccc3)(Oc3ccc(C=C)cc3)=NP(Oc3ccccc3)(Oc3ccc(C=C)cc3)=N2)cc1]

Self-Prepared Compound D:

The o-hydroxybenzaldehyde in the preparation method of the self-prepared Compound A1 was replaced with p-hydroxybenzaldehyde, and the other steps and conditions were the same to obtain Compound D, as shown below.

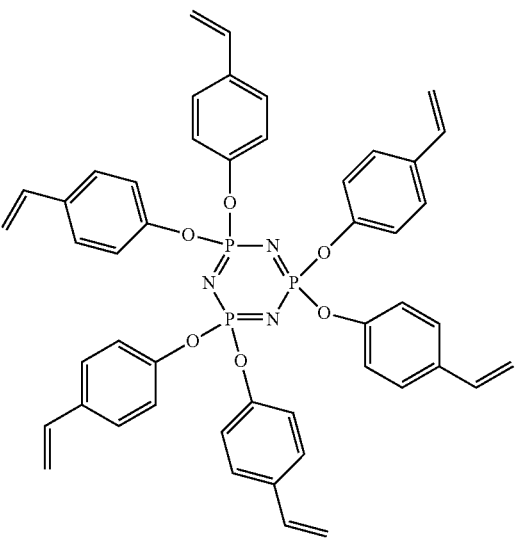 [SMILES: C=Cc1ccc(OP2(Oc3ccc(C=C)cc3)=NP(Oc3ccc(C=C)cc3)(Oc3ccc(C=C)cc3)=NP(Oc3ccc(C=C)cc3)(Oc3ccc(C=C)cc3)=N2)cc1]

Self-Prepared Compound A7:

31.2 g of NaH and 400 mL of anhydrous THF were added to a 1 L three-necked flask in the presence of $N_2$, and the temperature was increased to 50° C. with stirring; 97.7 g of o-hydroxybenzaldehyde was dissolved in 200 mL of anhydrous THF, which was added slowly to the three-necked flask. The reaction was continued after the addition for 4 hours, and 34.7 g of hexachlorocyclotriphosphazene was dissolved in 200 mL of anhydrous THF, and the mixture was added to the three-necked flask, followed by increasing the temperature to 65° C. and reacting for 48 hours, centrifuged, filtered for several times and dried to obtain hexa(2-aldehydephenoxy)cyclotriphosphazene.

Dried methyl triphenylphosphonium bromide and calcium hydride were added to anhydrous THF to obtain an active phosphorus ylide, followed by adding hexa(2-aldehydephenoxy)cyclotriphosphazene. The molar ratio of aldehyde group to phosphorus ylide is 1:0.6, and the ratio of aldehyde group to vinyl group is close to 1:1. After the reaction was completed, acetic acid was added with stirring for 1 hour, and the mixture was filtered to obtain the self-prepared Compound A7, having the structure of Formula (16), n=3, having a pH of 7, wherein J is o-vinylphenoxy group, K is the group of Formula (17), the number of J is 3, and the total number of J and K is 6.

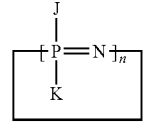

Formula (16)

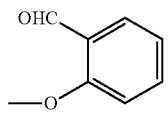

Formula (17)

Compositions and test results of resin compositions of Examples and Comparative Examples are listed below (in part by weight):

TABLE 1

| Resin compositions of Examples (in part by weight) and test results | | | | | | | | |
|---|---|---|---|---|---|---|---|---|
| Component | | E1 | E2 | E3 | E4 | E5 | E6 | E7 |
| polyolefin | G1726 | 50 | 50 | 50 | 50 | 50 | 50 | 50 |
| | B-3000 | 50 | 50 | 50 | 50 | 50 | 50 | 50 |
| | Ricon 100 | | | | | | | |
| | Ricon 184MA6 | | | | | | | |
| compound of Formula (1) | A1 | 10 | 30 | 50 | | | | |
| | A2 | | | | 30 | | | |
| | A3 | | | | | 30 | | |
| | A4 | | | | | | 30 | |
| | A5 | | | | | | | |
| | A6 | | | | | | | 30 |
| Prepolymer 1 | | | | | | | | |
| Prepolymer 2 | | | | | | | | |
| unsaturated C=C double bond-containing polyphenylene ether resin | SA9000 | | | | | | | |
| | OPE-2st 2200 | | | | | | | |
| unsaturated C=C double bond-containing crosslinking agent | DVB | | | | | | | |
| | TAIC | | | | | | | |
| Compound B | | | | | | | | |
| Compound C | | | | | | | | |
| Compound D | | | | | | | | |
| SPV-100 | | | | | | | | |
| Di-DOPO | | | | | | | | |
| PX-200 | | | | | | | | |
| S-2 | | | | | | | | |
| Compound A7 | | | | | | | | |
| compound of Formula (2) | B1 | | | | | | | |
| | B2 | | | | | | | |
| compound of Formula (3) | C1 | | | | | | | |
| | C2 | | | | | | | |
| compound of Formula (4) | D1 | | | | | | | |
| inorganic filler | SC-2500-SVJ | 100 | 100 | 100 | 100 | 100 | 100 | 100 |
| curing initiator | 25B | 0.6 | 0.6 | 0.6 | 0.6 | 0.6 | 0.6 | 0.6 |
| solvent | toluene | PA | PA | PA | PA | PA | PA | PA |
| Item | Unit | E1 | E2 | E3 | E4 | E5 | E6 | E7 |
| resin filling uniformity | none | OK | OK | OK | OK | OK | OK | OK |
| dissipation factor variation rate under heat | % | 30 | 27 | 26 | 26 | 28 | 29 | 26 |
| glass transition temperature | °C. | 228 | 234 | 238 | 230 | 231 | 225 | 228 |
| Z-axis ratio of thermal expansion | % | 1.50 | 1.34 | 1.28 | 1.38 | 1.40 | 1.49 | 1.50 |
| peeling strength | lb/in | 3.3 | 3.5 | 3.7 | 3.6 | 3.5 | 3.5 | 3.3 |
| thermal resistance after moisture absorption | none | OOO | OOO | OOO | OOO | OOO | OOO | OOO |

TABLE 2

Resin compositions of Examples (in part by weight) and test results

| Component | | E8 | E9 | E10 | E11 | E12 | E13 | E14 | E15 |
|---|---|---|---|---|---|---|---|---|---|
| polyolefin | G1726 | | 50 | 100 | 40 | 50 | 50 | | |
| | B-3000 | 100 | 50 | | 40 | 30 | 50 | | |
| | Ricon 100 | | | | 20 | 15 | | | |
| | Ricon 184MA6 | | | | | 5 | | | |
| compound of Formula (1) | A1 | 10 | 30 | 50 | 50 | 25 | 25 | | |
| | A2 | | | | | | | | |
| | A3 | | | | | | | | |
| | A4 | | | | | 3 | | | |
| | A5 | | | | | | | | |
| | A6 | | | | | 2 | | | |
| | Prepolymer 1 | | | | | | | 110 | |
| | Prepolymer 2 | | | | | | | | 150 |
| unsaturated C=C double bond-containing polyphenylene ether resin | SA9000 | | | | | 10 | | | |
| | OPE-2st 2200 | 10 | | | 5 | 10 | | 10 | 5 |
| unsaturated C=C double bond-containing crosslinking agent | DVB | | | | | 5 | | | |
| | TAIC | | | | | 5 | | | |
| | Compound B | | | | | | | | |
| | Compound C | | | | | | | | |
| | Compound D | | | | | | | | |
| | SPV-100 | | | | | | | | |
| | Di-DOPO | | | | | | | | |
| | PX-200 | | | | | 1 | | | |
| | S-2 | | | | | 1 | | | |
| | Compound A7 | | | | | | 5 | | |
| compound of Formula (2) | B1 | 0.003 | 0.003 | 0.003 | | 0.001 | 0.003 | 0.003 | |
| | B2 | | | | | 0.002 | | | |
| compound of Formula (3) | C1 | | | | | 0.001 | | | |
| | C2 | | | | | 0.001 | | | |
| compound of Formula (4) | D1 | | | | 0.500 | 0.001 | | | 0.500 |
| inorganic filler | SC-2500-SVJ | 100 | 100 | 100 | 80 | 130 | 100 | 100 | 80 |
| curing initiator | 25B | 0.6 | 0.6 | 0.6 | 0.5 | 1.0 | 0.6 | 0.6 | 0.5 |
| solvent | toluene | PA | PA | PA | PA | PA | PA | PA | PA |
| Item | Unit | E8 | E9 | E10 | E11 | E12 | E13 | E14 | E15 |
| resin filling uniformity | none | OK | OK | OK | OK | OK | OK | OK | OK |
| dissipation factor variation rate under heat | % | 20 | 19 | 16 | 20 | 21 | 20 | 18 | 18 |
| glass transition temperature | °C. | 232 | 237 | 243 | 233 | 228 | 230 | 235 | 235 |
| Z-axis ratio of thermal expansion | % | 1.42 | 1.33 | 1.30 | 1.36 | 1.41 | 1.42 | 1.38 | 1.30 |
| peeling strength | lb/in | 3.7 | 3.5 | 3.7 | 3.6 | 3.9 | 3.9 | 3.3 | 3.5 |
| thermal resistance after moisture absorption | none | OOO | OOO | OOO | OOO | OOO | OOO | OOO | OOO |

TABLE 3

Resin compositions of Comparative Examples (in part by weight) and test results

| Component | | C1 | C2 | C3 | C4 | C5 | C6 | C7 | C8 |
|---|---|---|---|---|---|---|---|---|---|
| polyolefin | G1726 | 50 | 50 | 50 | 50 | 50 | 50 | 50 | 50 |
| | B-3000 | 50 | 50 | 50 | 50 | 50 | 50 | 50 | 50 |
| | Ricon 100 | | | | | | | | |
| | Ricon 184MA6 | | | | | | | | |
| compound of Formula (1) | A1 | 5 | 60 | | | | | | |
| | A2 | | | | | | | | |
| | A3 | | | | | | | | |
| | A4 | | | | | | | | |

TABLE 3-continued

Resin compositions of Comparative Examples (in part by weight) and test results

| Component | | | C1 | C2 | C3 | C4 | C5 | C6 | C7 | C8 |
|---|---|---|---|---|---|---|---|---|---|---|
| | | A5 | | | 30 | | | | | |
| | | A6 | | | | | | | | |
| unsaturated C=C double bond-containing polyphenylene ether resin | | SA9000 | | | | | | | | |
| | | OPE-2st 2200 | | | | | | | | |
| unsaturated C=C double bond-containing crosslinking agent | | DVB | | | | | | | | |
| | | TAIC | | | | | | | | |
| | Compound B | | | | | 30 | | | | |
| | Compound C | | | | | | 30 | | | |
| | Compound D | | | | | | | 30 | | |
| | SPV-100 | | | | | | | | 30 | |
| | Di-DOPO | | | | | | | | | 30 |
| | PX-200 | | | | | | | | | |
| | S-2 | | | | | | | | | |
| | Compound A7 | | | | | | | | | |
| compound of Formula (2) | | B1 | | | | | | | | |
| | | B2 | | | | | | | | |
| compound of Formula (3) | | C1 | | | | | | | | |
| | | C2 | | | | | | | | |
| compound of Formula (4) | | D1 | | | | | | | | |
| inorganic filler | | SC-2500-SVJ | 100 | 100 | 100 | 100 | 100 | 100 | 100 | 100 |
| curing initiator | | 25B | 0.6 | 0.6 | 0.6 | 0.6 | 0.6 | 0.6 | 0.6 | 0.6 |
| solvent | | toluene | PA | PA | PA | PA | PA | PA | PA | PA |
| Item | | Unit | C1 | C2 | C3 | C4 | C5 | C6 | C7 | C8 |
| resin filling uniformity | | none | OK | OK | OK | pattern | pattern | pattern | pattern | pattern |
| dissipation factor variation rate under heat | | % | 44 | 48 | 54 | 63 | 70 | 57 | 67 | 61 |
| glass transition temperature | | ° C. | 205 | 214 | 220 | 130 | 123 | 128 | 116 | 128 |
| Z-axis ratio of thermal expansion | | % | 1.55 | 1.35 | 2.03 | 2.12 | 1.70 | 1.98 | 2.31 | 2.05 |
| peeling strength | | lb/in | 2.7 | 2.8 | 2.5 | 2.0 | 1.9 | 2.1 | 2.0 | 2.1 |
| thermal resistance after moisture absorption | | none | OOX | OOX | OXX | XXX | OXX | XXX | XXX | OOX |

Examples and Comparative Examples of resin compositions were prepared as follows (the solid content of the components of each Example and Comparative Example is 100%).

Example E1

50 parts by weight of G1726, 50 parts by weight of B-3000 and 10 parts by weight of the Compound A1 were added in a proper amount of toluene (controlling the solid content of the whole resin composition to 65%), and mixed and stirred to fully dissolve the solid components to form a homogeneous liquid state. 100 parts by weight of SC-2500-SVJ was then added and stirred until fully dispersed, followed by adding 0.6 part by weight of 25B and stirring for 1 hour at room temperature to obtain the resin composition Example E1.

Examples E2-E13 and Comparative Examples C1-C8

According to the processes described in the preparation of the resin composition Example E1, the polyolefin, the compound of Formula (1) (or Compound B, Compound C, Compound D or other flame retardants for comparison) and other components were added in the solvent in sequence, and mixed and stirred to fully dissolve the solid components to form a homogeneous liquid state. Inorganic filler was then added and stirred until fully dispersed, followed by adding curing initiator and stirring for 1 hour at room temperature to obtain the resin composition Examples E2-E13 or the resin composition Comparative Examples C1-C8.

Examples E14 and E15

110 parts by weight of the Prepolymer 1 and 10 parts by weight of OPE-2st 2200 were added in a proper amount of toluene (controlling the solid content of the whole resin composition to 65%), and mixed and stirred to fully dissolve the solid components to form a homogeneous liquid state. 100 parts by weight of SC-2500-SVJ was then added and stirred until fully dispersed, followed by adding 0.003 part by weight of the Compound B1 of Formula (2) and 0.6 part by weight of 25B and stirring for 1 hour at room temperature to obtain the resin composition E14, and the resin composition E15 was prepared by reference to this preparation method.

In addition, samples (specimens) were prepared as described below and tested and analyzed under specified conditions below.

1. Prepreg: Resin composition from each Example or each Comparative Example (in part by weight) was respectively well mixed in a stirred tank to form a varnish. Then the varnish was loaded to an impregnation tank, and a fiberglass fabric (e.g., 2116, 1080 or 1017 L-glass fiber fabric, available from Asahi) was impregnated into the impregnation tank to adhere the resin composition onto the fiberglass fabric, followed by heating and baking at 140° C. for about 6 minutes to obtain a prepreg.
2. Copper-containing laminate (e.g., copper-clad laminate, 5-ply, formed by lamination of five prepregs): Two 18 μm RTF copper foils (reverse treated copper foils) and five prepregs obtained from 2116 L-glass fiber fabrics impregnated with each Example or Comparative Example and having a resin content of about 55% were prepared and stacked in the order of a copper foil, five prepregs and a copper foil, followed by lamination under vacuum at 32 kgf/cm² pressure and 200° C. for 120 minutes to form a copper-containing laminate. In the sample, five superimposed prepregs were cured to form the insulation layer between the two copper foils, wherein the insulation layer has a resin content of about 55%.
3. Copper-containing laminate (e.g., copper-clad laminate, 2-ply, formed by lamination of two prepregs): Two 18 μm RTF copper foils (reverse treated copper foils) and two prepregs obtained from 1080 L-glass fiber fabrics impregnated with each Example or Comparative Example and having a resin content of about 70% were prepared and stacked in the order of a copper foil, two prepregs and a copper foil, followed by lamination under vacuum at 32 kgf/cm² pressure and 200° C. for 120 minutes to form a copper-containing laminate. In the sample, two superimposed prepregs were cured to form the insulation layer between the two copper foils, wherein the insulation layer has a resin content of about 70%.
4. Copper-free laminate (5-ply, formed by lamination of five prepregs): Each aforesaid copper-containing laminate (5-ply) was etched to remove the two copper foils to obtain a copper-free laminate (5-ply) formed by laminating five sheets of prepreg and having a resin content of about 55%.
5. Copper-free laminate (2-ply, formed by lamination of two prepregs): Each aforesaid copper-containing laminate (2-ply) was etched to remove the two copper foils to obtain a copper-free laminate (2-ply) formed by laminating two sheets of prepreg and having a resin content of about 70%.

Each sample was analyzed as described below.

1. Resin Filling Uniformity

Figure 2:
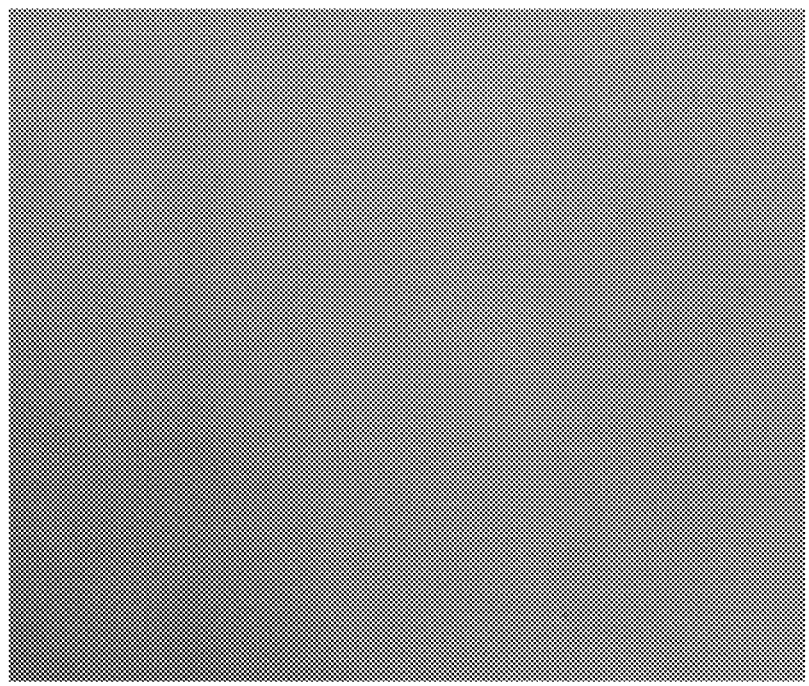
FIG. 2 shows the appearance of a normal laminate.

A 2.5 mil copper-containing laminate (such as product EM-827, available from Elite Material Co., Ltd.) was subjected to a conventional brown oxidation process to make a brown oxide treated wiring laminate as the inner layer used to evaluate the capability of resin flowing to and filling the open area between traces during prepreg lamination. The varnish of the resin composition from each Example or each Comparative Example was used to impregnate a 1017 L-glass fiber fabric and then baked at 140° C. for 4 minutes to obtain a prepreg with a resin content of about 79%. The 2.5 mil brown oxide treated wiring laminate was covered on both sides with the aforesaid prepreg (obtained by impregnating a 1017 L-glass fiber fabric with the resin composition from each Example or each Comparative Example), and then the outermost layers were respectively covered with a 18 μm RTF copper foil. Lamination was performed for 2 hours by using a vacuum laminator at 450 psi and 210° C. to form an inner layer wiring laminate with surface copper, and then the outermost copper foils were removed by etching to obtain an inner layer wiring laminate without surface copper. The copper-free surface of the inner layer wiring laminate without surface copper was examined with naked eyes to determine whether a pattern exists. The presence of patterns in the laminate after lamination represents a poor resin filling uniformity, resulting in unacceptable defective circuit boards. A designation of "pattern" is given if a pattern is present (as illustrated in FIG. 1); a designation of "OK" is given if no pattern is present (as illustrated in FIG. 2), representing an excellent resin filling uniformity.

2. Dissipation Factor Variation Rate Under Heat (Df Variation Rate Under Heat)

The copper-free laminate sample (obtained by laminating two prepregs) was tested by using a microwave dielectrometer available from AET Corp. by reference to JIS C2565 at 10 GHz at room temperature (about 25° C.), and the dissipation factor of each sample thus measured is designated as Df1. Then the sample was washed with distilled water and placed in an environment of 188° C. for 48 hours, followed by another measurement of the dissipation factor, which is designated as Df2. The Df variation rate under heat is equal to $((Df2-Df1)/Df1)*100\%$.

3. Glass Transition Temperature (Tg)

The copper-free laminate (obtained by laminating five prepregs) was subject to glass transition temperature measurement. The glass transition temperature (in ° C.) of each sample was measured by using a dynamic mechanical analysis (DMA) method by reference to IPC-TM-650 2.4.24.4 at a temperature range of 35° C. to 270° C. with a temperature increase rate of 2° C./minute. Higher glass transition temperature represents a better property of the sample.

4. Z-Axis Ratio of Thermal Expansion (Percent Thermal Expansion, Z-Axis, Z-PTE)

The copper-free laminate (obtained by laminating five prepregs) sample was subject to thermal mechanical analysis (TMA) during Z-axis ratio of thermal expansion measurement. Each sample was heated from 50° C. to 260° C. at a heating rate of 10° C./minute and then subjected to the measurement of the percent (%) of thermal expansion in Z-axis in a temperature range of 50° C. to 260° C. by reference to IPC-TM-650 2.4.24.5. Lower Z-axis ratio of thermal expansion is better.

5. Peeling Strength (P/S)

The copper-containing laminate (obtained by laminating five prepregs) was cut into a rectangular specimen with a width of 24 mm and a length of greater than 60 mm, which was etched to remove surface copper foil, leaving a rectangular copper foil with a width of 3.18 mm and a length of greater than 60 mm, and tested by using a tensile strength tester by reference to IPC-TM-650 2.4.8 at room temperature (about 25° C.) to measure the force (lb/in) required to separate the copper foil from the insulation layer of the laminate.

6. Thermal Resistance After Moisture Absorption (Pressure Cooking Test, PCT)

A copper-free laminate sample (obtained by laminating five prepregs) was used in the thermal resistance after moisture absorption test. By reference to IPC-TM-650

2.6.16.1, the sample was subjected to a pressure cooking test (PCT) for 5 hours of moisture absorption (at a temperature of 121° C. and a relative humidity of 100%), and then, by reference to IPC-TM-650 2.4.23, immersed into a 288° C. solder bath for 20 seconds, removed and then inspected to determine the absence or presence of delamination. Each Example or Comparative Example was evaluated by testing three identical samples, and a designation of "X" was given to represent delamination in any sample, indicating interlayer separation or blistering of the insulation layers of the laminate. The absence of delamination, which represents pass (designation of "O"), means no interlayer delamination and blistering occurring between insulation layers. OOO represents no delamination in all three samples, XXX represents delamination in all three samples, OOX represents delamination in one sample and no delamination in two samples, and OXX represents delamination in two samples and no delamination in one sample.

The following observations can be made according to the test results above.

From the comparison and observation of Examples E14-E15 and other Examples, it can be confirmed that the resin composition of the present disclosure, either the technical solution including a polyolefin and a compound of Formula (1) (having a pH value of 10 or less) or the technical solution including a prepolymer obtained by subjecting a polyolefin and a compound of Formula (1) (having a pH value of 10 or less) to a prepolymerization reaction, can achieve improvements in one or more properties including resin filling uniformity, dissipation factor variation rate under heat, glass transition temperature, Z-axis ratio of thermal expansion, peeling strength and thermal resistance after moisture absorption.

A side-by-side comparison of Examples E1 and E3 and Comparative Examples C1 and C2 indicates that if the amount of the compound of Formula (1) is not in a range of 10 parts by weight to 50 parts by weight, it will fail to achieve significant improvements in properties including dissipation factor variation rate under heat, glass transition temperature, peeling strength and thermal resistance after moisture absorption.

From the observation of each Example and Comparative Example C3, it can be observed that if the pH value of the compound of Formula (1) is greater than 10, it will fail to achieve significant improvements in properties including dissipation factor variation rate under heat, glass transition temperature, Z-axis ratio of thermal expansion, peeling strength and thermal resistance after moisture absorption.

From the observation of each Example and Comparative Examples C4-C8, it can be observed that if other compound different in structure from the compound of Formula (1) is used, instead of using a compound of Formula (1) (having a pH value of 10 or less), it will fail to achieve significant improvements in properties including resin filling uniformity, dissipation factor variation rate under heat, glass transition temperature, Z-axis ratio of thermal expansion, peeling strength and thermal resistance after moisture absorption.

From the comparison of all Examples E1-E13 and all Comparative Examples C1-C8, it can be confirmed that articles made from the resin composition disclosed herein may achieve at the same time significant improvements in properties including resin filling uniformity, dissipation factor variation rate under heat, glass transition temperature, Z-axis ratio of thermal expansion, peeling strength and thermal resistance after moisture absorption. In contrast, Comparative Examples C1-C8 not using the technical solution of the present disclosure fail to achieve the aforesaid technical effects.

The above detailed description is merely illustrative in nature and is not intended to limit the embodiments of the subject matter or the application and uses of such embodiments. As used herein, the term "exemplary" means "serving as an example, instance, or illustration." Any implementation described herein as exemplary is not necessarily to be construed as more preferred or advantageous over other implementations.

Moreover, while at least one exemplary example or comparative example has been presented in the foregoing detailed description, it should be appreciated that a vast number of variations exist. It should also be appreciated that the exemplary one or more embodiments described herein are not intended to limit the scope, applicability, or configuration of the claimed subject matter in any way. Rather, the foregoing detailed description will provide those skilled in the art with a convenient guide for implementing the described one or more embodiments. Also, various changes can be made in the function and arrangement of elements without departing from the scope defined by the claims, which include known equivalents and all foreseeable equivalents at the time of filing this patent application.

What is claimed is:

1. A resin composition, comprising the following components or a prepolymer thereof:
   (A) 100 parts by weight of a polyolefin; and
   (B) 10 parts by weight to 50 parts by weight of a compound of Formula (1) having a pH value of 10 or less;

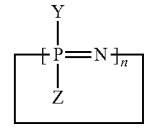

Formula (1)

in Formula (1), n is an integer of 3 to 6, each Y and Z are independently selected from o-vinylphenoxy group and phenoxy group, and each Y and Z are not phenoxy group at the same time;

wherein the prepolymer is prepared by subjecting a mixture to a prepolymerization reaction, and the mixture at least comprises the component (A) and the component (B); and wherein an article made from the resin composition has a dissipation factor variation rate under heat of less than or equal to 30% calculated according to a dissipation factor as measured by reference to JIS C2565 at 10 GHz after being subject to standing still at 188° C. for 48 hours.

2. The resin composition of claim 1, wherein the compound of Formula (1) has a pH value of 5 to 10.

3. The resin composition of claim 1, wherein the polyolefin comprises polybutadiene, polyisoprene, styrene-butadiene copolymer, styrene-isoprene copolymer, styrene-butadiene-divinylbenzene terpolymer, styrene-butadiene-maleic anhydride terpolymer, vinyl-polybutadiene-urethane oligomer, maleic anhydride-butadiene copolymer, polymethylstyrene, hydrogenated polybutadiene, hydrogenated styrene-butadiene-divinylbenzene terpolymer, hydrogenated styrene-butadiene-maleic anhydride terpolymer, hydrogenated styrene-butadiene copolymer, hydrogenated styrene-isoprene copolymer or a combination thereof.

4. The resin composition of claim 1, further comprising 0.001 part by weight to 0.5 part by weight of a compound of Formula (2), a compound of Formula (3), a compound of Formula (4) or a combination thereof:

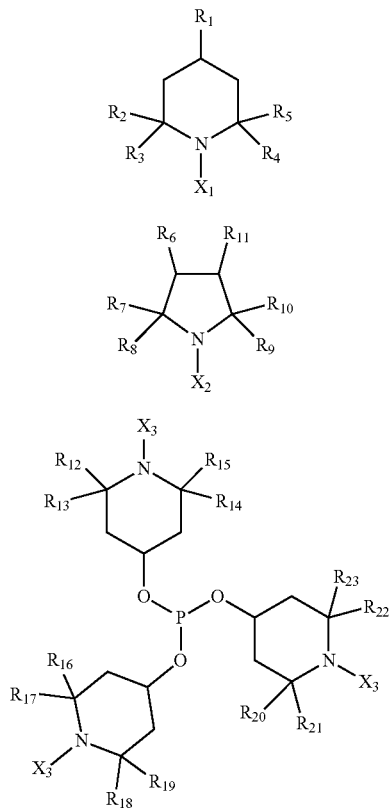

Formula (2)

Formula (3)

Formula (4)

wherein $X_1$ is an oxygen radical or a hydroxyl group; $R_2$ to $R_5$ are independently a hydrogen atom or a C1-C5 alkyl group, and $R_2$ to $R_5$ are not a hydrogen atom at the same time; and $R_1$ is a hydrogen atom, a C1-C5 alkyl group, an amino group, a hydroxyl group, a carbonyl group or a carboxyl group;

wherein $X_2$ is an oxygen radical or a hydroxyl group; $R_7$ to $R_{10}$ are independently a hydrogen atom or a C1-C5 alkyl group, and $R_7$ to $R_{10}$ are not a hydrogen atom at the same time; and $R_6$ and $R_{11}$ are independently a hydrogen atom, a C1-C5 alkyl group, an amino group, a hydroxyl group, a carbonyl group or a carboxyl group, or $R_6$ and $R_{11}$ together define a benzene ring structure;

wherein $X_3$ each independently is an oxygen radical or a hydroxyl group; and $R_{12}$ to $R_{23}$ are independently a hydrogen atom or a C1-C5 alkyl group, and $R_{12}$ to $R_{23}$ are not a hydrogen atom at the same time.

5. The resin composition of claim 1, wherein the prepolymer is prepared by subjecting the component (A) and the component (B) to a prepolymerization reaction having a conversion rate of between 10% and 99%.

6. The resin composition of claim 1, further comprising an unsaturated C=C double bond-containing polyphenylene ether resin.

7. The resin composition of claim 1, further comprising 1,2-bis(vinylphenyl)ethane, bis(vinylbenzyl)ether, divinylbenzene, divinylnaphthalene, divinylbiphenyl, t-butyl styrene, triallyl isocyanurate, triallyl cyanurate, 1,2,4-trivinyl cyclohexane, diallyl bisphenol A, styrene, butadiene, decadiene, octadiene, vinylcarbazole, acrylate or a combination thereof.

8. The resin composition of claim 1, further comprising a benzoxazine resin, an epoxy resin, a polyester resin, a phenolic resin, an amine curing agent, a polyamide, a polyimide, a styrene maleic anhydride, a maleimide resin, a cyanate ester, a maleimide triazine resin or a combination thereof.

9. The resin composition of claim 1, further comprising flame retardant, curing accelerator, inorganic filler, surface treating agent, coloring agent, solvent, toughening agent or a combination thereof.

10. An article made from a resin composition, the article comprising a prepreg, a resin film, a laminate or a printed circuit board, wherein:
the resin composition comprises the following components or a prepolymer thereof:
(A) 100 parts by weight of a polyolefin; and
(B) 10 parts by weight to 50 parts by weight of a compound of Formula (1) having a pH value of 10 or less;

Formula (1)

in Formula (1), n is an integer of 3 to 6, each Y and Z are independently selected from o-vinylphenoxy group and phenoxy group, and each Y and Z are not phenoxy group at the same time;
wherein the prepolymer is prepared by subjecting a mixture to a prepolymerization reaction, and the mixture at least comprises the component (A) and the component (B), and the article has a dissipation factor variation rate under heat of less than or equal to 30% calculated according to a dissipation factor as measured by reference to JIS C2565 at 10 GHz after being subject to standing still at 188° C. for 48 hours.

11. The article of claim 10, having a glass transition temperature as measured by reference to IPC-TM-650 2.4.24.4 of greater than or equal to 225° C.

12. The article of claim 10, having a Z-axis ratio of thermal expansion as measured by reference to IPC-TM-650 2.4.24.5 of less than or equal to 1.52%.

13. The article of claim 10, having a peeling strength as measured by reference to IPC-TM-650 2.4.8 of greater than or equal to 3.3 lb/in.

14. The article of claim 10, characterized in that no delamination occurs after subjecting the article to a thermal resistance after moisture absorption test by reference to IPC-TM-650 2.6.16.1 and IPC-TM-650 2.4.23.

* * * * *